(12) United States Patent
Massey

(10) Patent No.: US 11,607,042 B1
(45) Date of Patent: *Mar. 21, 2023

(54) TELEVISION MOUNTING SYSTEMS

(71) Applicant: Manehu Product Alliance, LLC, Carlsbad, CA (US)

(72) Inventor: Kurt William Massey, Mooresville, NC (US)

(73) Assignee: Manehu Product Alliance, LLC, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/587,792

(22) Filed: Jan. 28, 2022

Related U.S. Application Data

(63) Continuation of application No. 17/516,287, filed on Nov. 1, 2021, which is a continuation of application
(Continued)

(51) Int. Cl.
*A47B 97/00* (2006.01)
*F16M 13/02* (2006.01)
(Continued)

(52) U.S. Cl.
CPC .......... *A47B 97/001* (2013.01); *F16M 11/06* (2013.01); *F16M 11/10* (2013.01);
(Continued)

(58) Field of Classification Search
CPC ......... F16M 11/2092; F16M 2200/044; F16M 2200/063; F16M 11/2014; F16M 11/10; F16M 11/06; A47B 97/001
See application file for complete search history.

(56) References Cited

U.S. PATENT DOCUMENTS 2,090,439 A    8/1937   George
2,630,854 A    3/1953   Paul
(Continued)

FOREIGN PATENT DOCUMENTS

CA     3073367 A1    3/2019
CN    104424849 A    3/2015
(Continued)

OTHER PUBLICATIONS

ISA, International Search Report and Written Opinion for International Application No. PCT/IB2018/57591, dated Jan. 28, 2019.
(Continued)

*Primary Examiner* — Bradley Duckworth
(74) *Attorney, Agent, or Firm* — Perkins Coie LLP

(57) ABSTRACT

A mounting system capable of mounting objects to support structures. The mounting system includes a wall mount including a display bracket configured to hold the object, a fixed support bracket coupleable to a vertical support structure, and a linkage assembly. The linkage assembly has a low-profile stowed configuration in which the object is held in a raised position close to the support structure. The linkage assembly moves to another configuration to move the object. The object can be held in a lowered position. A biasing mechanism can facilitate convenient movement of the object.

40 Claims, 18 Drawing Sheets

Related U.S. Application Data

No. 16/370,841, filed on Mar. 29, 2019, now Pat. No. 11,178,354, which is a continuation of application No. 16/101,345, filed on Aug. 10, 2018, now Pat. No. 10,277,860, which is a continuation of application No. 15/851,510, filed on Dec. 21, 2017, now Pat. No. 10,257,460, which is a continuation of application No. 14/229,780, filed on Mar. 28, 2014, now Pat. No. 9,876,984, which is a continuation of application No. 13/118,297, filed on May 27, 2011, now Pat. No. 8,724,037.

(60) Provisional application No. 61/396,850, filed on Jun. 4, 2010.

(51) Int. Cl.
    *F16M 11/20* (2006.01)
    *F16M 11/06* (2006.01)
    *F16M 11/10* (2006.01)

(52) U.S. Cl.
    CPC ..... *F16M 11/2014* (2013.01); *F16M 11/2092* (2013.01); *F16M 13/02* (2013.01); *F16M 2200/044* (2013.01); *F16M 2200/063* (2013.01)

(56) References Cited

U.S. PATENT DOCUMENTS

| | | | |
|---|---|---|---|
| 4,076,351 A | 2/1978 | Wyant | |
| 4,082,244 A | 4/1978 | Groff | |
| 4,561,674 A | 12/1985 | Alessio | |
| 4,691,886 A | 9/1987 | Wendling et al. | |
| 5,037,054 A | 8/1991 | Mcconnell | |
| 5,108,063 A | 4/1992 | Koerber et al. | |
| 5,135,191 A | 8/1992 | Schmuhl | |
| 5,224,677 A | 7/1993 | Close | |
| 5,299,993 A | 4/1994 | Habing | |
| 5,499,956 A | 3/1996 | Habing et al. | |
| 5,560,501 A | 10/1996 | Rupert | |
| 5,738,316 A | 4/1998 | Sweere et al. | |
| 5,743,503 A * | 4/1998 | Voeller | F16M 11/2014 248/920 |
| 5,826,846 A | 10/1998 | Buccieri et al. | |
| 5,842,672 A * | 12/1998 | Sweere | F16M 11/105 248/278.1 |
| 5,857,756 A | 1/1999 | Fehre | |
| 5,876,008 A | 3/1999 | Sweere et al. | |
| 6,065,725 A | 5/2000 | Mason | |
| 6,065,909 A | 5/2000 | Cook | |
| 6,105,909 A | 8/2000 | Wirth et al. | |
| 6,419,196 B1 * | 7/2002 | Sweere | F16M 13/00 248/280.11 |
| 6,523,796 B2 | 2/2003 | Abramowsky et al. | |
| 6,592,090 B1 | 7/2003 | Li | |
| 6,695,274 B1 | 2/2004 | Chiu | |
| 6,889,404 B2 | 5/2005 | Lu et al. | |
| 6,905,101 B1 | 6/2005 | Dittmer | |
| 6,983,917 B2 * | 1/2006 | Oddsen, Jr. | F16M 11/2014 248/278.1 |
| 7,014,157 B2 | 3/2006 | Oddsen | |
| 7,061,753 B2 | 6/2006 | Michoux et al. | |
| 7,252,277 B2 | 8/2007 | Sweere et al. | |
| 7,290,744 B2 | 11/2007 | Baldasari | |
| 7,300,029 B2 | 11/2007 | Petrick et al. | |
| 7,314,200 B2 | 1/2008 | Bally et al. | |
| 7,395,996 B2 | 7/2008 | Dittmer | |
| 7,398,950 B2 | 7/2008 | Hung | |
| 7,448,584 B2 | 11/2008 | Chen et al. | |
| 7,546,745 B2 * | 6/2009 | Lee | F25D 29/005 312/405.1 |
| 7,546,994 B2 | 6/2009 | Altonji et al. | |
| 7,663,868 B1 | 2/2010 | Lam | |
| 7,854,415 B2 | 12/2010 | Holbrook et al. | |
| 7,866,622 B2 | 1/2011 | Dittmer | |
| 7,950,613 B2 | 5/2011 | Anderson et al. | |
| 8,006,440 B2 | 8/2011 | Thomas et al. | |
| 8,074,950 B2 | 12/2011 | Clary | |
| 8,094,438 B2 | 1/2012 | Dittmer et al. | |
| 8,333,355 B2 | 12/2012 | Stifal et al. | |
| 8,382,052 B1 | 2/2013 | Mathieson et al. | |
| 8,724,037 B1 * | 5/2014 | Massey | F16M 11/18 348/836 |
| 8,740,164 B2 | 6/2014 | Tachibana | |
| 8,746,635 B2 | 6/2014 | Kim et al. | |
| 8,864,092 B2 * | 10/2014 | Newville | F16M 13/02 361/679.01 |
| 8,960,632 B2 | 2/2015 | Fallows | |
| 9,004,430 B2 * | 4/2015 | Conner | H04N 5/655 248/920 |
| 9,016,648 B2 | 4/2015 | Smeenk | |
| 9,121,543 B2 * | 9/2015 | Dittmer | F16M 13/02 |
| 9,265,346 B1 | 2/2016 | Forney | |
| 9,433,293 B2 | 9/2016 | Gross et al. | |
| 9,625,091 B1 * | 4/2017 | Massey | F16M 11/04 |
| 9,876,984 B2 * | 1/2018 | Massey | F16M 11/2092 |
| 9,999,557 B2 | 6/2018 | Diaz-flores et al. | |
| 10,139,045 B1 | 11/2018 | Keuter | |
| 10,257,460 B2 * | 4/2019 | Massey | F16M 13/02 |
| 10,277,860 B2 * | 4/2019 | Massey | F16M 13/02 |
| 10,281,080 B1 * | 5/2019 | Massey | F16M 11/04 |
| 10,659,279 B2 | 5/2020 | Chiu et al. | |
| 10,738,941 B2 | 8/2020 | Newville et al. | |
| 10,830,580 B2 | 11/2020 | Hodowany | |
| 10,859,201 B2 * | 12/2020 | Newville | F16M 11/08 |
| 10,935,180 B1 * | 3/2021 | Massey | F16M 11/18 |
| 11,033,107 B2 * | 6/2021 | Warren | F16M 11/24 |
| 11,178,354 B2 * | 11/2021 | Massey | H04N 5/64 |
| 11,287,080 B2 | 3/2022 | Newville et al. | |
| 11,346,493 B2 | 5/2022 | Massey | |
| 11,346,496 B2 | 5/2022 | Newville | |
| 11,460,145 B2 | 10/2022 | Massey | |
| 2002/0033436 A1 | 3/2002 | Peng et al. | |
| 2002/0043978 A1 | 4/2002 | Mcdonald | |
| 2002/0100851 A1 | 8/2002 | Abramowsky et al. | |
| 2002/0179791 A1 | 12/2002 | Kwon | |
| 2004/0084587 A1 * | 5/2004 | Oddsen | F16M 11/10 248/284.1 |
| 2005/0010911 A1 | 1/2005 | Kim et al. | |
| 2005/0110911 A1 | 5/2005 | Childrey et al. | |
| 2005/0152102 A1 | 7/2005 | Shin | |
| 2005/0204645 A1 | 9/2005 | Bachinski et al. | |
| 2005/0236543 A1 | 10/2005 | Oneil | |
| 2006/0070210 A1 | 4/2006 | Amdahl et al. | |
| 2006/0077622 A1 | 4/2006 | Keely et al. | |
| 2006/0102819 A1 | 5/2006 | Li | |
| 2007/0007412 A1 | 1/2007 | Wang | |
| 2007/0023599 A1 | 2/2007 | Fedewa | |
| 2007/0030405 A1 * | 2/2007 | Childrey | F16M 11/2092 348/794 |
| 2007/0040084 A1 * | 2/2007 | Sturman | F16M 11/041 248/280.11 |
| 2007/0205340 A1 | 9/2007 | Jung | |
| 2007/0221807 A1 | 9/2007 | Park | |
| 2007/0252056 A1 | 11/2007 | Novin | |
| 2008/0078906 A1 | 4/2008 | Hung | |
| 2008/0237424 A1 * | 10/2008 | Clary | F16M 11/046 248/283.1 |
| 2009/0034178 A1 | 2/2009 | Le | |
| 2009/0050757 A1 | 2/2009 | Oh et al. | |
| 2009/0050763 A1 | 2/2009 | Dittmer | |
| 2009/0108158 A1 | 4/2009 | Kim et al. | |
| 2009/0179133 A1 | 7/2009 | Gan et al. | |
| 2009/0206221 A1 | 8/2009 | Timm et al. | |
| 2009/0212669 A1 | 8/2009 | Robert-reitman et al. | |
| 2010/0006725 A1 | 1/2010 | Kim et al. | |
| 2010/0091438 A1 | 4/2010 | Dittmer | |
| 2010/0149736 A1 | 6/2010 | Dittmer et al. | |
| 2010/0155558 A1 | 6/2010 | Zhang et al. | |
| 2010/0171013 A1 | 7/2010 | Anderson et al. | |
| 2011/0043978 A1 | 2/2011 | Bremmon et al. | |
| 2011/0234926 A1 | 9/2011 | Smith | |

(56) References Cited

U.S. PATENT DOCUMENTS

| | | |
|---|---|---|
| 2012/0032062 A1 | 2/2012 | Newville |
| 2012/0033371 A1 | 2/2012 | Pankros et al. |
| 2012/0061543 A1 | 3/2012 | Juan |
| 2012/0167486 A1 | 7/2012 | Lee |
| 2013/0176667 A1 | 7/2013 | Kulkarni et al. |
| 2013/0187019 A1 | 7/2013 | Dittmer et al. |
| 2013/0320163 A1 | 12/2013 | Wong |
| 2014/0211100 A1 | 7/2014 | Massey |
| 2015/0277214 A1 | 10/2015 | Schuh |
| 2017/0105529 A1 | 4/2017 | Kozlowski et al. |
| 2018/0054156 A1 | 2/2018 | Lokey |
| 2018/0131895 A1 | 5/2018 | Massey |
| 2018/0310459 A1 | 11/2018 | Blunier |
| 2018/0352189 A1 | 12/2018 | Massey |
| 2019/0072231 A1 | 3/2019 | Newville et al. |
| 2019/0309895 A1 | 10/2019 | Newville |
| 2019/0335135 A1 | 10/2019 | Massey |
| 2020/0049304 A1* | 2/2020 | Hung ............... F16M 11/08 |
| 2020/0355319 A1 | 11/2020 | Newville et al. |
| 2020/0408353 A1 | 12/2020 | Massey |
| 2021/0190259 A1 | 6/2021 | Newville |
| 2022/0150441 A1 | 5/2022 | Massey |
| 2022/0252209 A1 | 8/2022 | Newville |

FOREIGN PATENT DOCUMENTS

| | | |
|---|---|---|
| CN | 109605346 A | 4/2019 |
| CN | 111031859 A | 4/2020 |
| GB | 2222939 A | 3/1990 |
| GB | 2579974 A | 7/2020 |
| KR | 100705069 B1 | 4/2007 |
| KR | 20070081731 A | 8/2007 |
| WO | 2019043670 A1 | 3/2019 |
| WO | 2019183822 A1 | 10/2019 |
| WO | 2021127552 A1 | 6/2021 |

OTHER PUBLICATIONS

ISA, International Search Report and Written Opinion, PCT Patent Application PCT/US2020/066196, dated Apr. 9, 2021, 13 pages.
ISA, International Search Report and Written Opinion, PCT Patent Application PCT/US2021/017141, dated Jun. 1, 2021, 11 pages.
ISA, International Search Report and Written Opinion, PCT Patent Application PCT/US2021/017492, dated Jun. 3, 2021, 17 pages.
MantelMount MM750 Pro Above Fireplace Pull Down TV Mount, accessed Dec. 3, 2020 from https://www.mantelmount.com/products/mm750-pro-pull-down-tv-mount, 6 pages.
MantelMount RB100 Recess Box—MantelMount Pull Down TV Mount Accessory, accessed Dec. 3, 2020 from https://www.mantelmount.com/products/mantelmount-rb100-recess-box, 6 pages.
ISA, International Preliminary Report on Patentability for International Application No. PCT/IB2018/57591, dated Mar. 10, 2020, 7 pages.
ISA, International Search Report and Written Opinion for International Application No. PCT/IB2018/57591, dated Jan. 28, 2019, 8 pages.

* cited by examiner

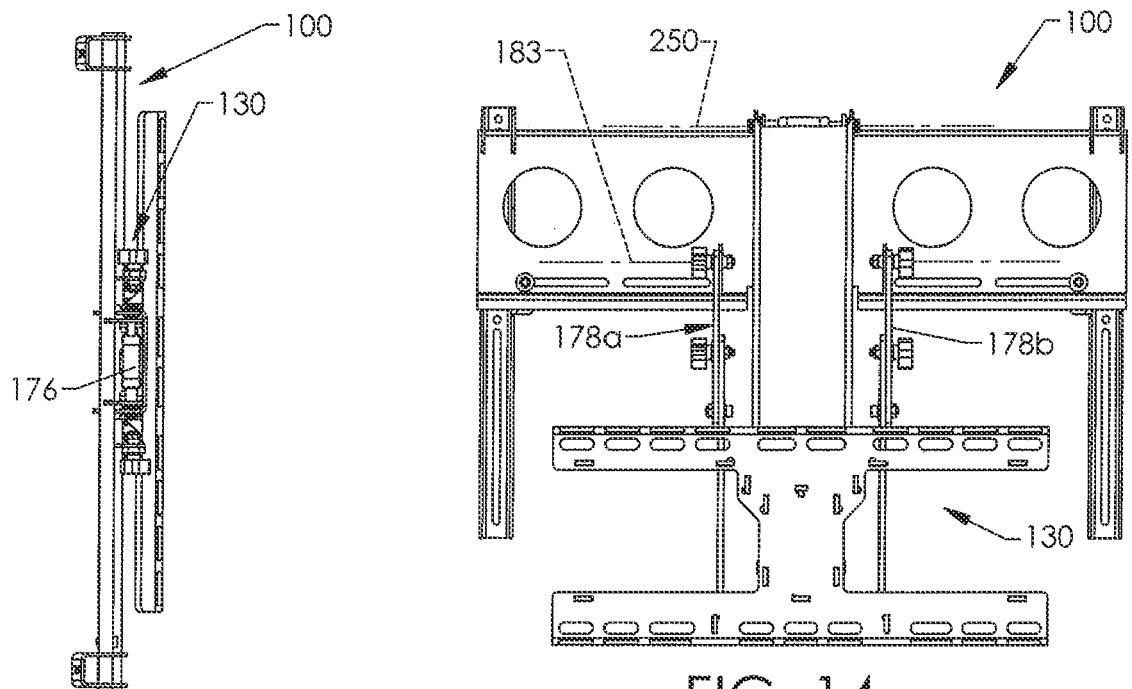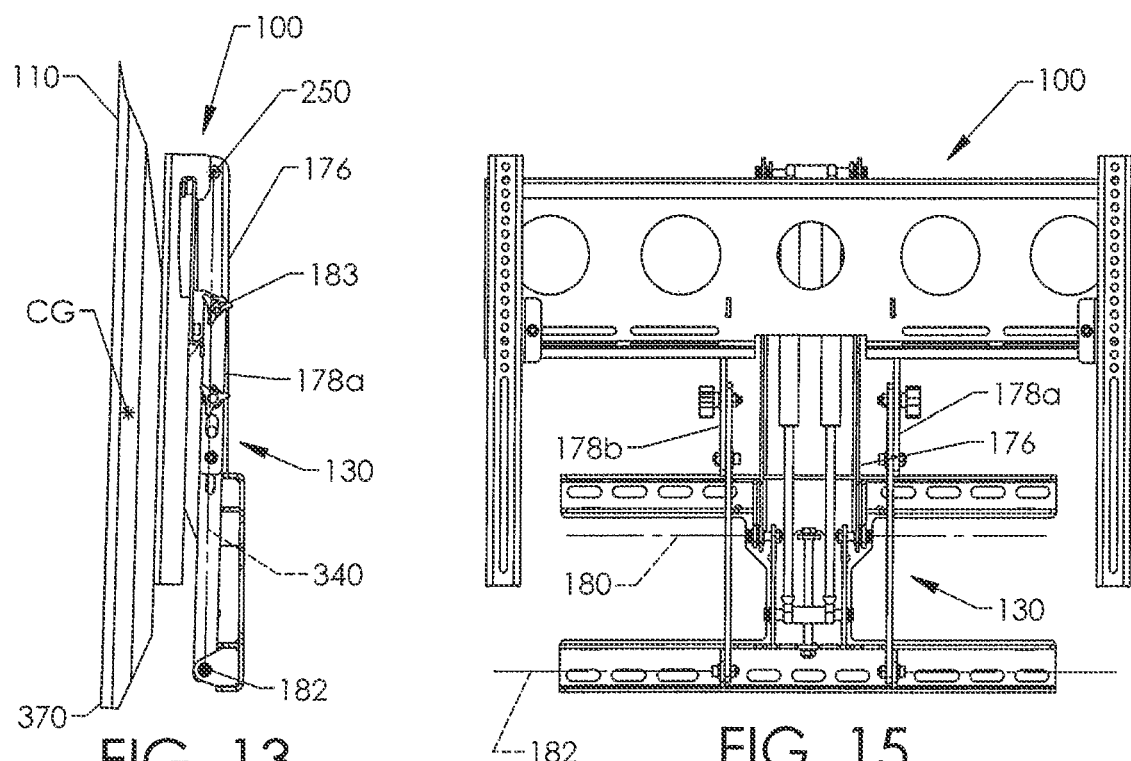

TELEVISION MOUNTING SYSTEMS

CROSS-REFERENCE TO RELATED APPLICATIONS AND PATENTS

This application is a continuation of U.S. patent application Ser. No. 17/516,287, filed Nov. 1, 2021; which is a continuation of U.S. patent application Ser. No. 16/370,841, filed Mar. 29, 2019, now U.S. Pat. No. 11,178,354; which is a continuation of U.S. patent application Ser. No. 16/101,345, filed Aug. 10, 2018, now U.S. Pat. No. 10,277,860; which is a continuation of U.S. patent application Ser. No. 15/851,510, filed Dec. 21, 2017, now U.S. Pat. No. 10,257,460; which is a continuation of U.S. patent application Ser. No. 14/229,780, filed Mar. 28, 2014, now U.S. Pat. No. 9,876,984; which is a continuation of U.S. patent application Ser. No. 13/118,297, filed May 27, 2011, now U.S. Pat. No. 8,724,037; and claims benefit of U.S. Provisional Patent Application No. 61/396,850, filed Jun. 4, 2010. These applications and patents are incorporated herein by reference in theft entireties.

TECHNICAL FIELD

The present invention relates generally to mounting systems. More specifically, the invention relates to mounting systems for mounting objects to structures.

BACKGROUND OF TECHNOLOGY

Televisions are often mounted directly to walls using wall mounts. Tilting wall mounts and full motion wall mounts are two types of mounts that allow movement of the television. Tilting wall mounts often allow tilting about a horizontal axis of rotation. Unfortunately, if tilting wall mounts are installed at relatively high locations, there may be limited viewing because ideal viewing often requires that the center of the screen be level with a viewer's eyes. Full motion wall mounts often allow movement of the television away from walls, swiveling of the television, and/or tilting of the television. If either a tilting wall mount or a full motion wall mount is installed above a fireplace, the mounted television is often much higher than a sitting viewer's eyes and, thus, may not provide comfortable viewing.

SUMMARY

At least some embodiments are directed to mounts capable of holding and moving objects. Mounted objects can be held at relatively high locations to keep the objects out of the way when stowed. Mounted objects can be conveniently moved to a desired position.

In certain embodiments, a wall mount can hold an electronic display in the form of a television. The wall mount can be installed above a fireplace or other aesthetically pleasing location. A user can manually or automatically lower the television such that the television is generally in front of the fireplace. A viewer's eyes can be generally level with the center of the screen. The television can be panned, tilted (e.g., rotated about a generally horizontal axis), and/or swiveled (e.g., rotated about a generally vertical axis) to accommodate different viewing positions. Pivots, swivels (e.g., swivel brackets), joints, or the like can be used to provide the desired motion. The television can range in weight from about 20 pounds to about 110 pounds.

A mounting system, in some embodiments, comprises a wall mount including a bracket configured to hold an object, a fixed support bracket coupleable to a vertical support structure, and a linkage assembly. The linkage assembly has a low-profile stowed configuration in which the object is held close to the support structure. The linkage assembly is movable to an expanded configuration to reposition the object at different heights. A biasing mechanism can facilitate movement of the object and, in some embodiments, can be in the form of a counterbalance mechanism.

In some embodiments, a wall mount includes a low-profile parallel mechanism in the form of a four bar linkage configured to store an object at a raised, low profile position close to the wall (e.g., within 5 inches of the wall). The mounted object can be moved away from the raised position along a path (e.g., an arcuate path, partially circular path, curved path, partially elliptical path, or the like). The four bar linkage can include a fixed linkage that connects to a main load bearing linkage through a pivot, which connects to an object mounting linkage through a pivot, which connects to an adjustable length linkage through a pivot, which connects back to the fixed linkage through a pivot. In certain embodiments, the fixed linkage is a support bracket, and the object mounting linkage is a display bracket.

One or more biasing mechanisms allow for controlled movement of the mounted object. Biasing mechanisms can be counterbalance mechanisms that are adjustable to vary balancing forces to counterbalance a wide range of different types of objects based on one or more criteria, including user preferences (e.g., a desired force required to move the object). Additionally or alternatively, a locking mechanism (e.g., a locking knob, a clamp, a pin, etc.) allows the user to lock at least one pivot, thereby allowing the object to be kept at any desired position. A tilt setting mechanism can be used to change the length of one or more links to adjust the tilt of the object. If the object is an electronic display held at a relatively high position, a tilt setting mechanism can be used to angle the electronic display downwardly such that a viewer's line of sight is generally perpendicular to the screen. As the display is lowered, the screen can be tilted to ensure that the screen remains generally perpendicular to the viewer's line of sight.

As the display moves towards the raised or up position, one of the pivots can move past a line extending between upper pivots and lower pivots, preferably pivots defined by a fixed linkage. Such an over-center configuration allows automatic locking of the mount into a low-profile configuration. A downwardly direct force applied to the display will not cause deploying of the wall mount. However, the display can be pulled away from the wall to release the wall mount. For example, a horizontally directed force (a force directed away from the wall) applied to the bottom of the display can cause the wall mount to unlock and deploy.

A mounting system, in some embodiments, includes a four bar linkage configured such that the mounted object tilts backward as the object moves downwardly. If the object is an electronic display, the screen can be substantially normal to someone looking at it, irrespective of the height of the electronic display. As the electronic display is raised, the electronic display can tilt forward until the electronic display is substantially parallel to the wall or at another desired orientation.

In some embodiments, a system comprises a low-profile wall mount including a display bracket configured to couple to a large screen television, a support bracket configured to couple to a wall, and a linkage assembly. The linkage assembly is rotatably coupled to the display bracket and rotatably coupled to the support bracket. The linkage assembly includes a first link and a second link extending alongside at least a portion of the first link when the linkage assembly is in a collapsed, low-profile stowed configuration, and in an upright position, so as to hold the large screen television in a raised position close to the wall. The second link is configured to be moved away from and substantially parallel to the first link as the linkage assembly moves away from the collapsed, low-profile stowed configuration so as to move the television to a lowered position which is close to a portion of the wall beneath the support bracket. The system further includes a biasing mechanism configured to counterbalance the weight of the large screen television. The biasing mechanism includes a force adjustment mechanism operable to increase or decrease a balancing force provided by the biasing mechanism to counterbalance different weights of different televisions.

The wall mount, in some embodiments, includes an upper outer pivot coupling an outer end of an upper link of the linkage assembly to the display bracket, a lower outer pivot coupling an outer end of a lower link of the linkage assembly to the display bracket, an upper inner pivot coupling an inner end of the upper link to the support bracket, and a lower inner pivot coupling an inner end of the lower link to the support bracket. An upper outer axis of rotation is defined by the upper outer pivot. A lower inner axis of rotation is defined by the lower inner pivot. A lower outer axis of rotation is defined by the lower outer pivot that is movable across an imaginary plane to move the linkage assembly from the collapsed, low-profile stowed configuration to a deployed configuration to lower the television. The upper outer axis of rotation and the lower inner axis of rotation lay in an imaginary plane when the linkage assembly is in the collapsed, low-profile stowed configuration.

In yet other embodiments, a system includes a low-profile mounting system for holding an electronic display. The low-profile mounting system includes a display bracket configured to hold the electronic display, a fixed support bracket coupleable to a vertical support structure, and a linkage assembly rotatably coupled to the display bracket and rotatably coupled to the fixed support bracket. The linkage assembly has a collapsed stowed configuration in which the linkage assembly is in a substantially upright position to hold the electronic display in a stowed position, an expanded configuration in which the linkage assembly extends substantially horizontally away from the fixed support bracket, and a lowered configuration in which the linkage assembly extends downwardly away from the fixed support bracket to hold the electronic display in a lowered position.

In some embodiments, the linkage assembly can be positioned to define an angle of declination of at least about 5 degrees. For example, the angle of declination can be in a range of about 5 degrees to about 90 degrees. If the mount is positioned above a mantel, the maximum angle of angle of declination can be about 60 degrees. Other angles are also possible.

The linkage assembly can be configured to substantially maintain a tilt of the electronic display as the linkage assembly lowers the electronic display. In some embodiments, the electronic display remains parallel to the vertical support structure as the electronic display is lowered. In other embodiments, the electronic display tilts slightly as it is lowered.

In yet further embodiments, a mounting system includes a display bracket for holding a display, a fixed support bracket, and a linkage assembly. The linkage assembly is rotatably coupled to the fixed support bracket and carries the display bracket. The linkage assembly is reconfigurable to move a display held by the display bracket from a stowed position to a lowered position while keep the display in a substantially vertical orientation. A top of the display is lower than a top of the fixed support bracket when the display is in the lowered position.

BRIEF DESCRIPTION OF THE DRAWINGS

Non-limiting and non-exhausting embodiments are discussed with reference to the following drawings. The same reference numerals refer to like parts or acts throughout the various views, unless specified otherwise.

FIG. 12 is a top plan view of the stowed mounting system.

FIG. 13 is a side elevational view of the stowed mounting system of FIG. 12 holding a television.

FIG. 14 is a back elevational view of the stowed mounting system of FIG. 12.

FIG. 15 is a front elevational view of the stowed mounting system of FIG. 12.

DETAILED DESCRIPTION

Figure 1:
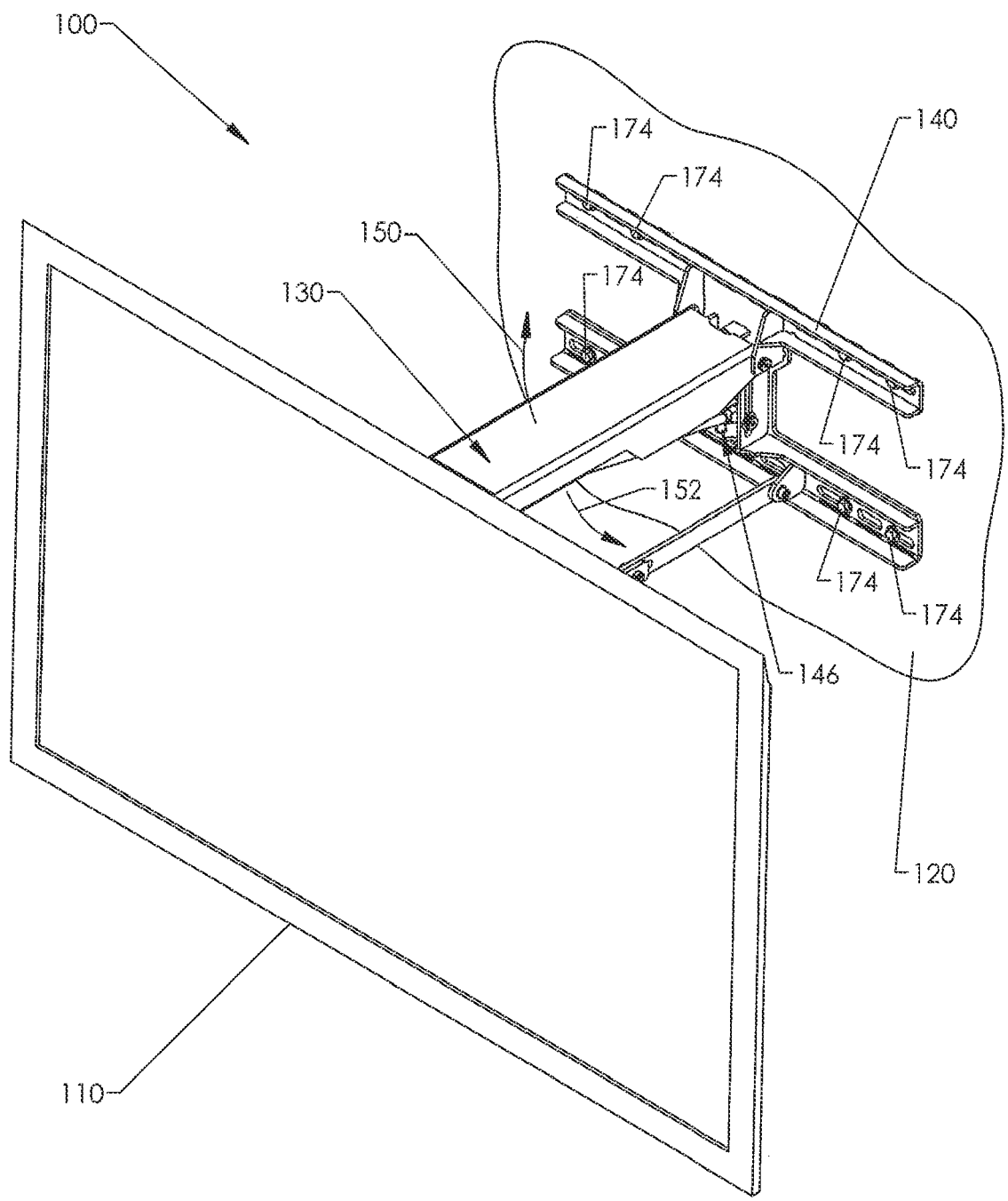
FIG. 1 is an isometric view of a television held by a mounting system connected to a wall.

FIG. 1 shows a mounting system in the form of a wall mount 100 carrying an electronic display in the form of a flat screen television 110. A collapsible linkage assembly 130 is connected to a support bracket 140 that is mounted to a support structure in the form of a wall 120. The linkage assembly 130 can swing upwardly (indicated by an arrow 150) or downwardly (indicated by an arrow 152). An adjustment mechanism 146 is operable to adjust a biasing force provided by a biasing mechanism to allow for controlled movement of the television 110. Once the television 110 is at a desired position, the biasing mechanism keeps the television 110 stationary.

Figure 2:
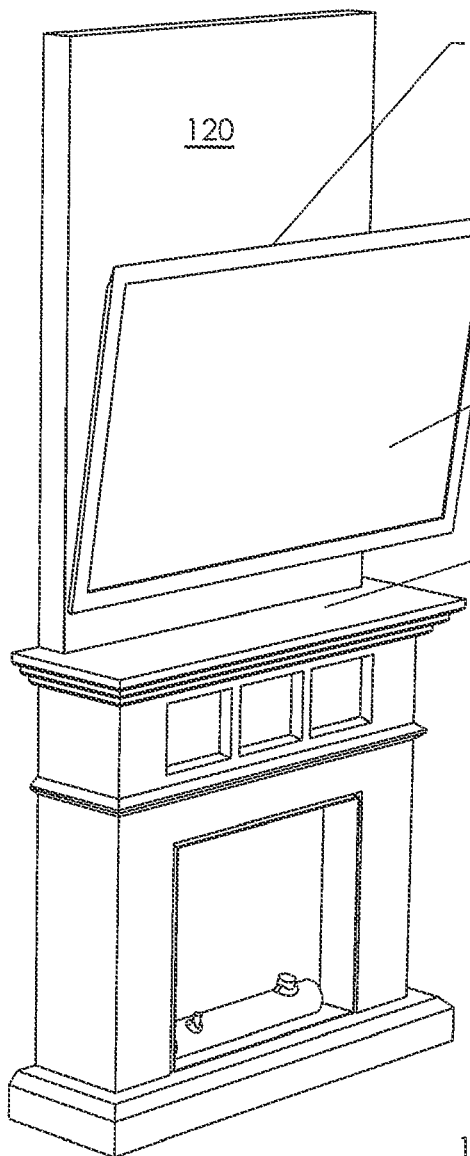
FIG. 2 is a pictorial view of a television installed above a fireplace.

FIG. 2 shows the television 110 in a raised, stowed position and very close to the wall 120. The wall mount 100 is hidden from view of someone in front of the television 110 for an aesthetically pleasing appearance. Advantageously, it may be difficult for small children to reach up and pull down on the television 110. The illustrated stowed television 110 is positioned above a fireplace to avoid occupying usable space and to reduce the likelihood of unwanted inadvertent contact by people moving about the room. If the fireplace includes a hearth, it may be difficult for small children, or other individuals, to inadvertently contact the television 110.

Figure 3:
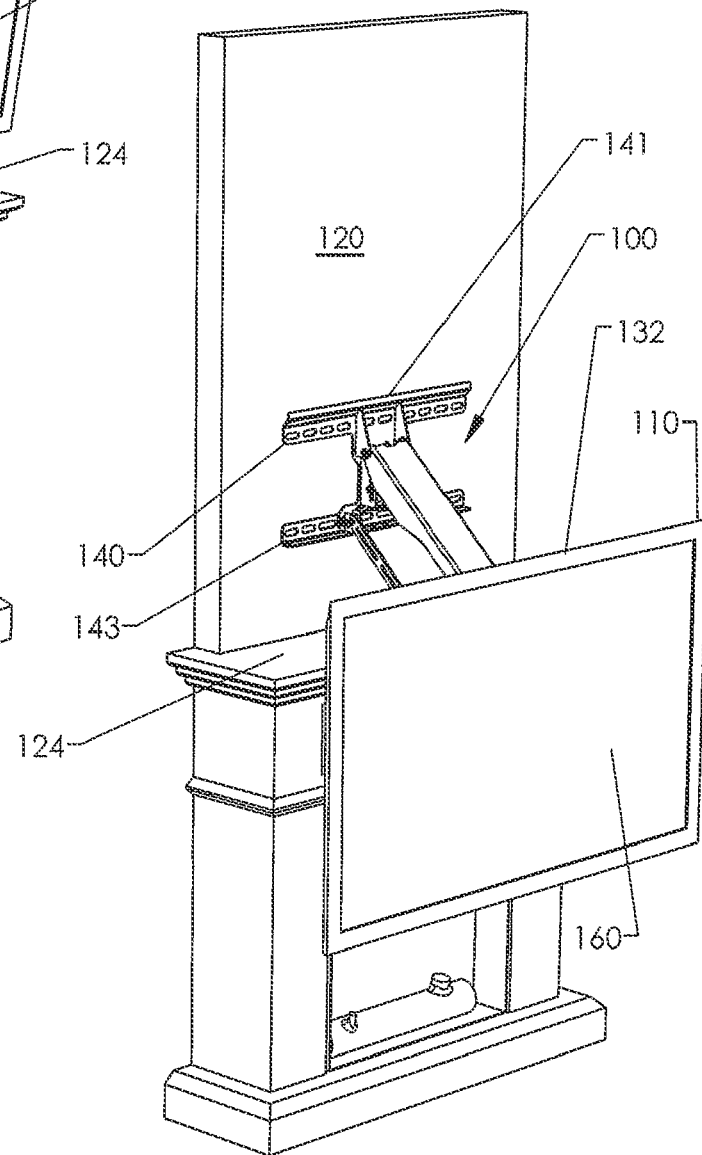
FIG. 3 shows the television in a lowered position in front of the fireplace.

The television 110 can swing downwardly and, if desired, can be positioned in front of the fireplace, as shown in FIG. 3. The lowered television 110 can be positioned very close to the front of the fireplace. Viewer's eyes can be generally level with a center of a screen 160. The lowered television 110 is especially well suited for viewing when someone is positioned near the television 110, for example, to play a game system (e.g., Xbox 360, PlayStation®, PlayStation®2, PlayStation®3, Nintendo game system, or the like), or to provide convenient viewing while sitting, for example, on furniture or on the floor. After viewing, television 110 can be returned to the stowed position.

Referring again to FIG. 2, a top 132 of the stowed television 110 can be angled forwardly such that the screen 160 is substantially perpendicular to a sitting viewer's line of sight. Alternatively, television 110 can be flat against the wall 120 (e.g., parallel to the wall 120) to minimize or limit unwanted reflections from the screen 160 that may be directed to someone sitting on furniture in front of the television 110, especially when the television 110 is turned OFF. The wall mount 100 can automatically tilt the television 110 as the television 110 moves vertically. As the television 110 is lowered, it is tilted to keep the screen 160 substantially perpendicular relative to the viewer's line of sight. Once the television 110 is at a desired position, the television 110 can be further tilted using a tilt mechanism, if needed or desired.

In some manually deployable embodiments, a user can conveniently grasp and pull the television 110 away from the wall 120. The television 110 will move forward a significant distance before it starts to move down a significant distance such that the television 110 can be brought down and in front of a protruding object below the support bracket 140, illustrated in FIGS. 2 and 3 as a fireplace mantel 124. The top 132 of the television 110 can be lower than a top 141 of the support bracket 140 and, in some embodiments, is positioned lower than a bottom 143 of the support bracket 140. One or more adjustable fixed stops can be used to prevent contact with the mantel 124 or to achieve repeatable positioning, or both.

The wall mount 100 can be coupled to a wide range of different types of support structures, such as walls of a dwelling (e.g., a house, an apartment, etc.), an office, a lobby, a bar (e.g., a sports bars), or the like and can be mounted to vertical walls or non-vertical walls, including, without limitation, angled walls, non-planar walls, or other structures sturdy enough to handle the load of the wall mount 100 and any attached object(s).

The television 110 can be, without limitation, a liquid crystal display (LCD) television, a plasma television, a light emitting diode (LED) television, or other type of flat screen television, as well as other types of wall mountable televisions. The weights of such televisions are often in a range of about 20 lbs. to about 110 lbs. and often have a maximum thickness less than about 5 inches. Advantageously, large screen televisions have a screen with a length (measured diagonally) equal to or greater than about 30 inches and can hide the entire wall mount 100, as shown in FIG. 2. The wall mount 100 can also hold small or medium screen televisions. Other types of electronic displays (e.g., monitors) or objects can be carried by the wall mount 100. Exemplary mountable objects include, but are not limited to, screens suitable for use with front projectors, boards (e.g., a chalk board, a dry erase board, etc.), containers (e.g., a basket, a bin, or the like), or the like.

Figure 4:
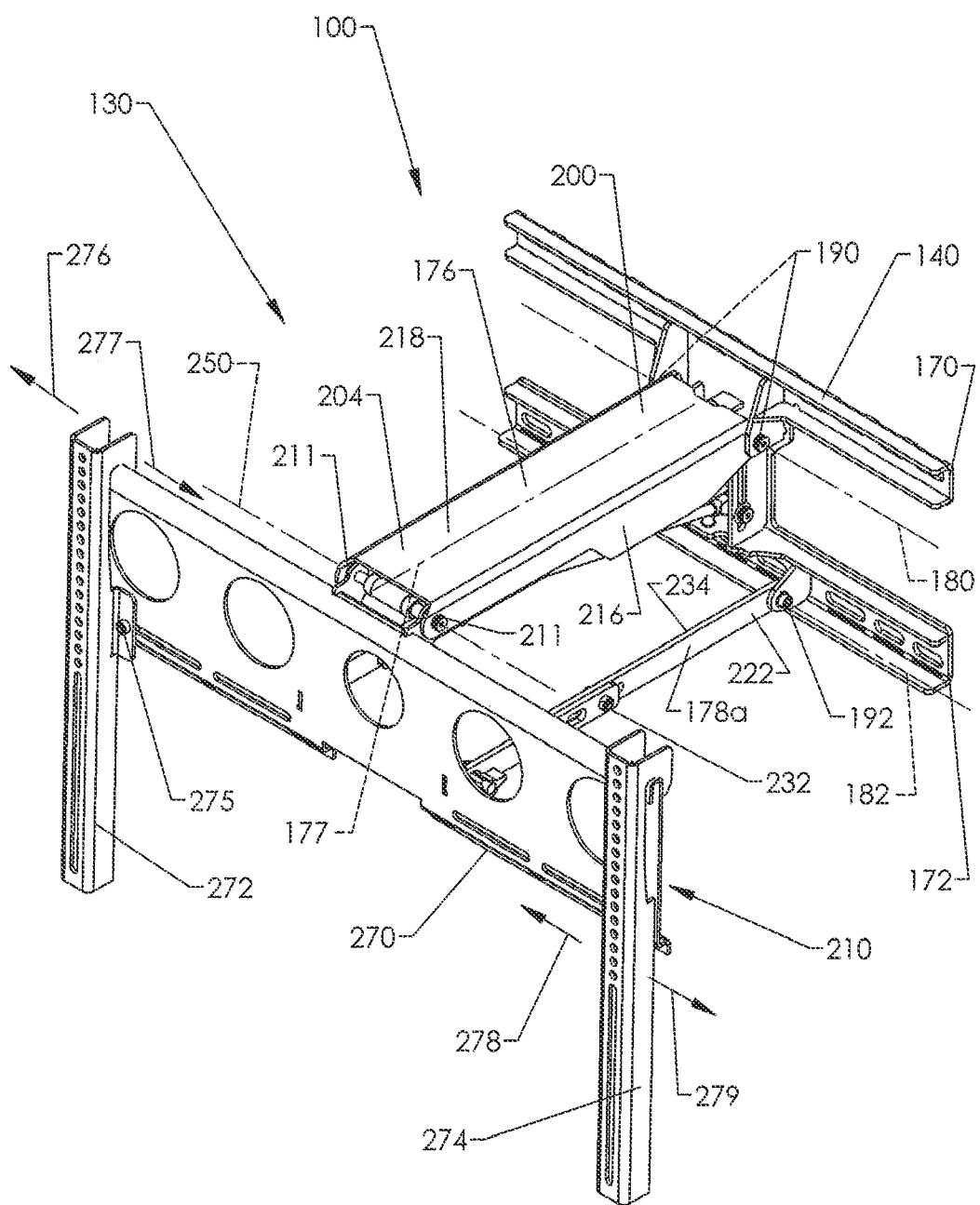
FIG. 4 is an isometric view of a mounting system, in accordance with one embodiment.
Figure 5:
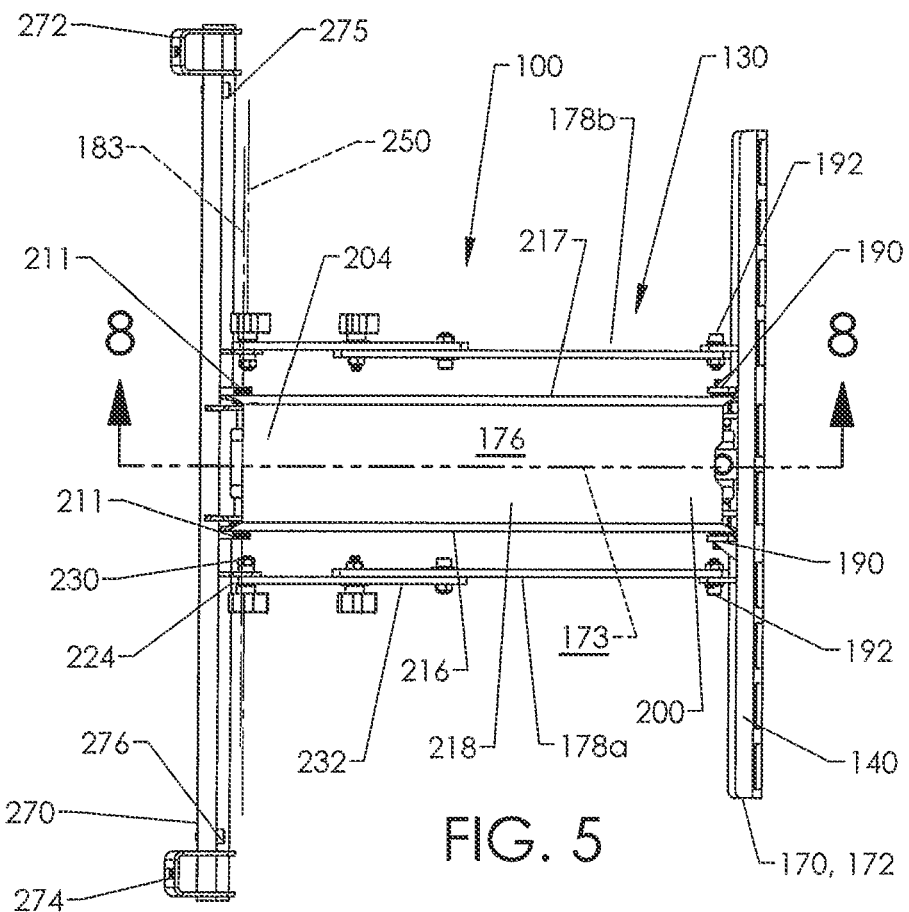
FIG. 5 is a top plan view of the mounting system of FIG. 4.
Figure 6:
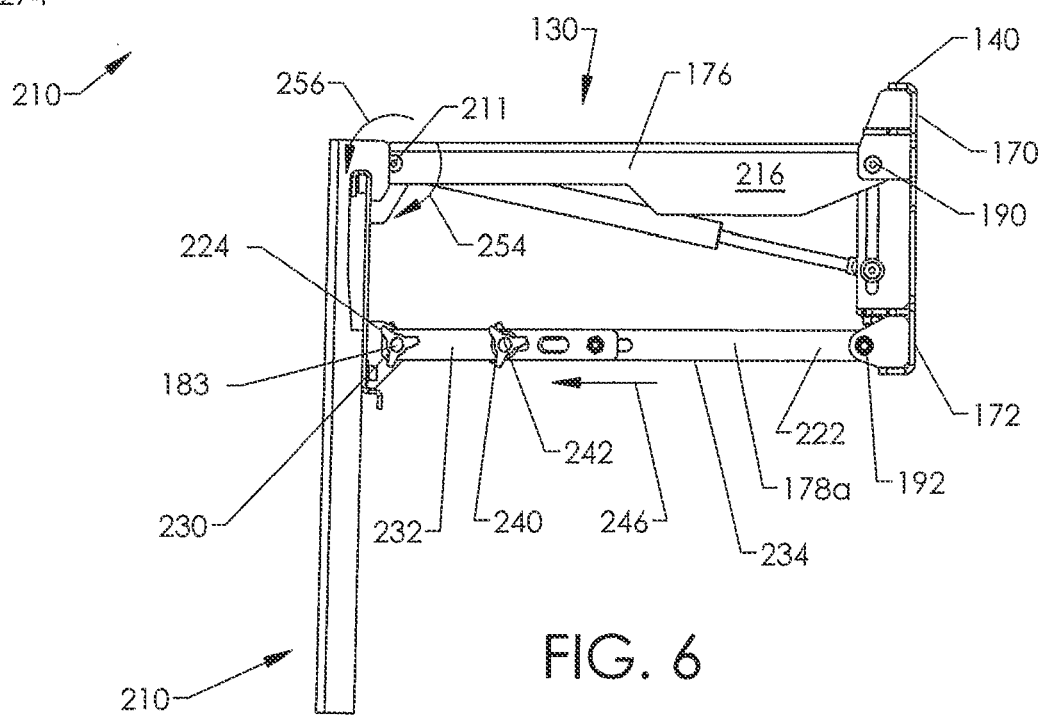
FIG. 6 is a side elevational view of the mounting system of FIG. 4.

FIGS. 4-6 show the support bracket 140, a display bracket 210, and the linkage assembly 130 that cooperate to define a four bar linkage. Support bracket 140 includes a pair of spaced apart elongate members 170, 172, each including a plurality of apertures for receiving fasteners, such as fasteners 174 in FIG. 1. As used herein, "bracket" is a broad term that includes one-piece or multi-piece structural supports configured to be coupled (e.g., fixedly coupled) to a support surface or structure. Brackets can be made, in whole or in part, of metal (e.g., steel, aluminum, etc.), composites, plastic, polymers, combinations thereof, or the like. In one-piece embodiments, a bracket can be formed using a stamping process, a machining process, or the like. In multi-piece embodiments, separate pieces can facilitate packaging for shipping. The pieces can be assembled after unpacking. Other types of one-piece or multi-piece brackets can be used, if needed or desired.

Referring to FIGS. 4 and 5, wall mount 100 is symmetrical with respect to a center plane 173 and, thus, may be described with reference to one side. A main bearing member in the form of an upper link 176 is rotatable about an upper axis of rotation 180 defined by support pivots 190. A pair of lower links 178a, 178b (collectively "178") are rotatable about a lower axis of rotation 182 defined by support pivots 192. The axes of rotation 180, 182 can lie in an imaginary plane which is substantially parallel to the wall 120.

The upper link 176 includes a support end 200 and an opposing bracket end 204. Pivots 190 couple the support end 200 to the bracket 140. Pivots 211 couple the bracket end 204 to the display bracket 210. The upper link 176 has a fixed length and a generally U-shaped transverse cross-section taken generally perpendicular to its longitudinal axis 177. Sidewalls 216, 217 are connected to an upper plate 218.

The lower links 178 are generally similar to one another and, accordingly, the description of one lower link applies equally to the other, unless indicated otherwise. The lower link 178a includes a support bracket end 222 rotatably coupled to the support bracket 140 by the pivot 192. FIG. 6 shows a pivot 230 coupling the display bracket end 224 to the display bracket 210 and defining an axis of rotation 183.

With reference to FIG. 6, the link 178a includes rigid slotted members 232, 234 and pins extending through the members 232, 234. The slotted members 232, 234 are slidable relative to one another. An adjustment mechanism in the form of a tilt adjustment mechanism 240 is slidably retained in a slot of the member 232 and a hole in the member 234. A handle 242 can be rotated to lock and unlock the link 178a. To lengthen the link 178a, the handle 242 is rotated counter-clockwise and the member 232 is slid away from the support bracket 140, as indicated by an arrow 246. The length of the link 178a can be increased to rotate the display bracket 210 clockwise (indicated by an arrow 254) about a tilt axis of rotation 250 (FIG. 5) defined by the pivots 211. The display bracket 210 can be rotated counter-clockwise about the tilt axis of rotation 250 (indicated by an arrow 256) by sliding the member 232 in the opposite direction. After the television 110 is in the desired orientation, the handle 242 is rotated clockwise to securely hold the member 232 between the member 234 and the handle 242. The dimensions (e.g., the longitudinal lengths) of the slots can be increased or decreased to increase or decrease the amount of tilt. Other locking mechanisms can include, without limitation, one or more rollers, slides (e.g., linear slides), locks, clamps, pins, ratchet mechanisms, or combinations thereof that cooperate to prevent, limit, or inhibit relative movement between components.

Referring to FIGS. 4 and 5, display bracket 210 includes a rail 270 and elongate arms 272, 274 hanging on the rail 270. The arms 272, 274 can be slid along the rail 270, as indicated by arrows 276, 277, 278, 279, to accommodate different sized objects. Fasteners 275, 276 fixedly couple the elongate arms 272, 274 to the rail 270. Fasteners can pass through apertures in the elongate arms 272, 274 to hold the television 110. Other types of display brackets can also be used. The configuration, size, and design of the display bracket can be selected based on the configuration, size, and design of the television or other object to be mounted.

Figure 7:
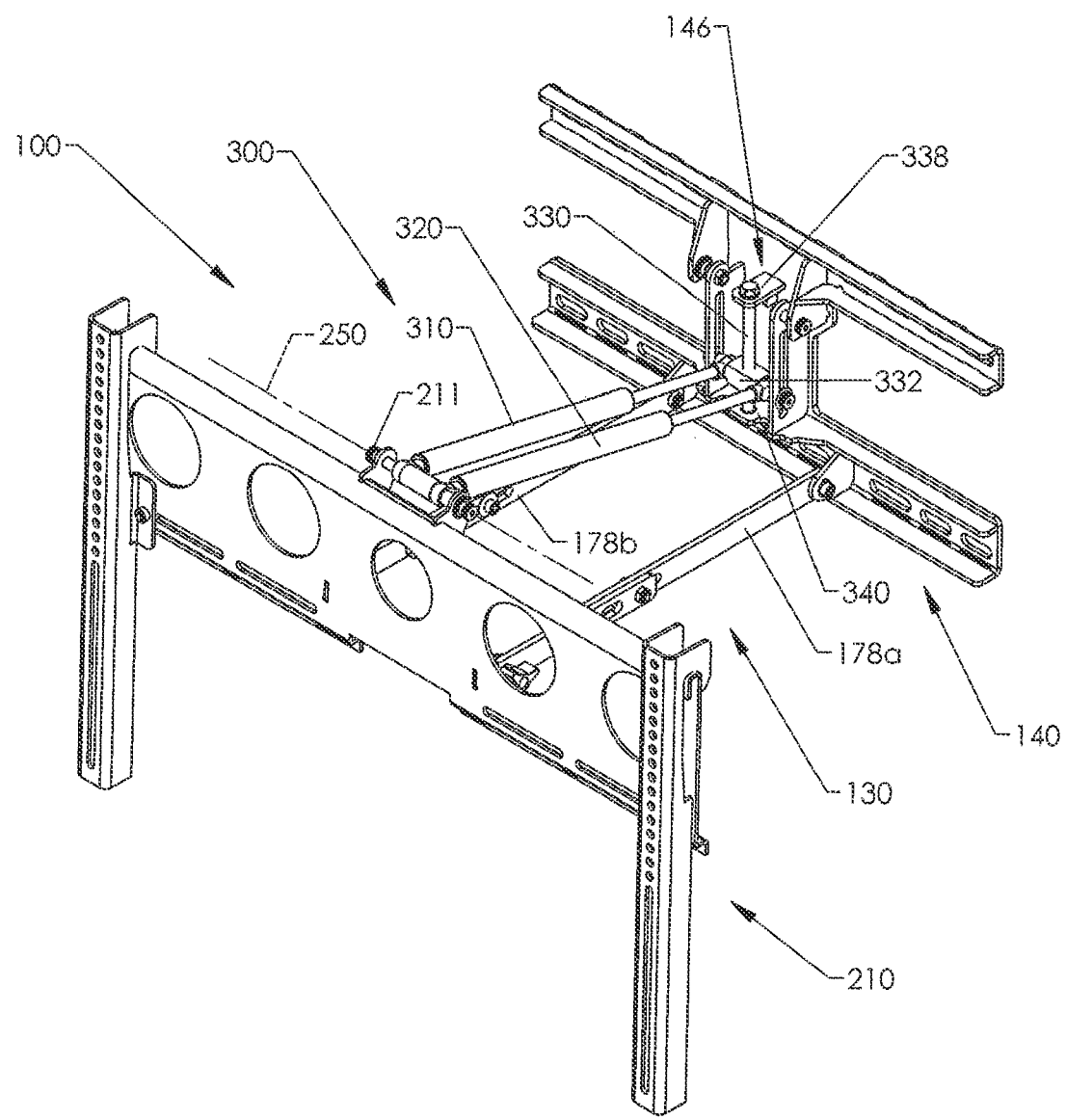
FIG. 7 is an isometric view of the mounting system with an upper arm shown removed.

FIG. 7 shows the wall mount 100 with the upper link removed. A biasing mechanism in the form of a counterbalance mechanism 300 cooperates with the linkage assembly 130 to allow a user to effortlessly move the television to different positions but prevents or inhibits movement of the television when the user does not apply a force. The television can be moved using a force that is less than a threshold force. The threshold force can be about 2 lbf., 3 lbf., 5 lbf., 10 lbf., or 20 lbf., as well as any other suitable threshold force. In some embodiments, counterbalance mechanism 300 counterbalances the weight of the television and the weight of the suspended components in order to allow movement with a desired amount of resistance (e.g., a minimal amount of resistance, a threshold amount of resistance, etc.). The counterbalance mechanism 300 can include force balancing devices, illustrated as pistons 310, 320 rotatably coupled to the display bracket 210 and support bracket 140. The pistons 310, 320 can be gas pistons, pneumatic pistons, or other type of biasing devices capable of providing a desired force, including, without limitation, a substantially constant force, variable force, or the like.

Figure 8:
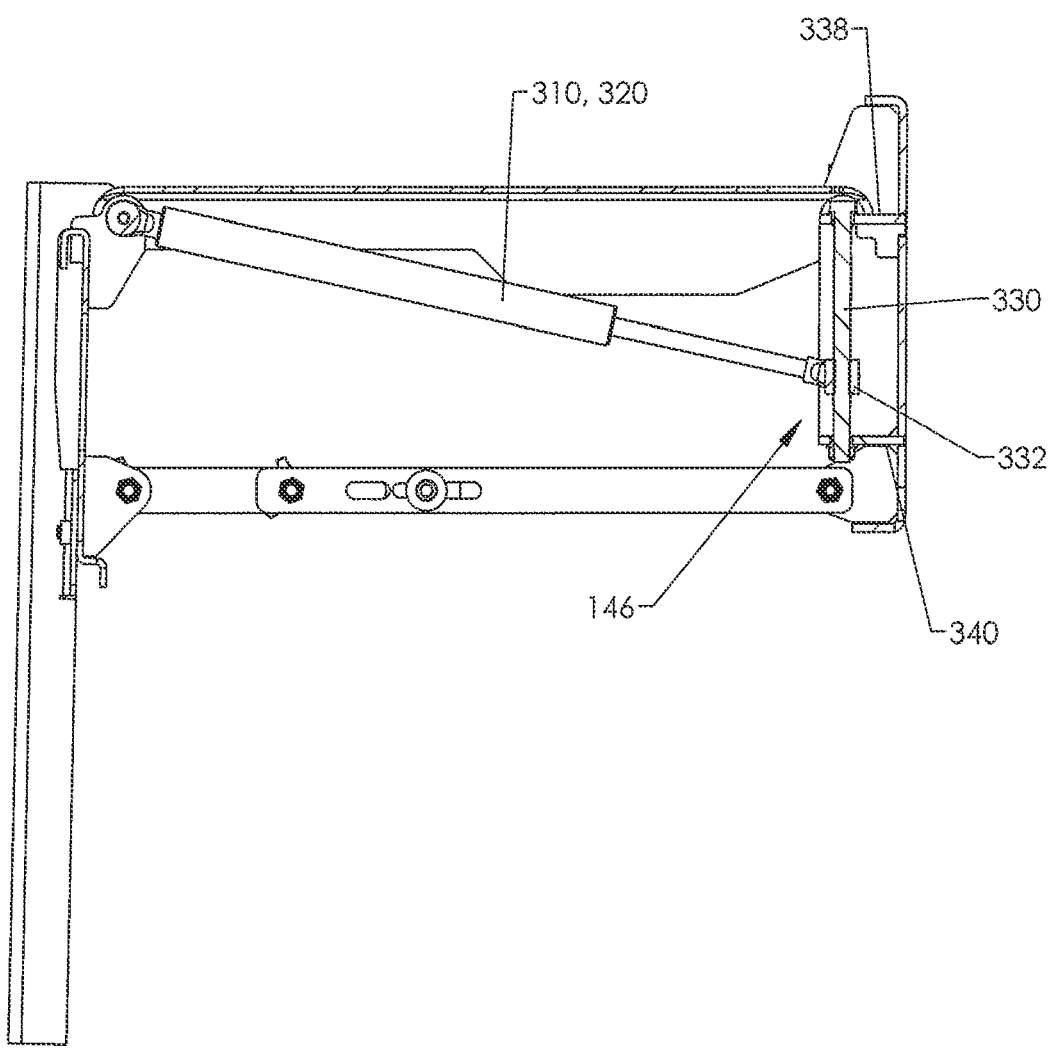
FIG. 8 is a cross-sectional view of the mounting system taken along a line 8-8 of FIG. 5.

Referring to FIGS. 7 and 8, force adjustment mechanism 146 includes a threaded rod 330 held by holders 338, 340 of the support bracket 140. The rod 330 can be rotated to move a carriage 332 upwardly or downwardly. The carriage 332 is rotatably coupled to the counterbalance mechanism 300 and can be in a first position such that the counterbalance mechanism 300 is in a first setting or configuration to provide a first balancing force. The carriage 332 can be moved to a second position such that the counterbalance mechanism 300 is in a second setting or configuration to provide a second balancing force that is substantially different from the first balancing force. For example, the first balancing force can counterbalance a television that weighs about 100 pounds wherein the second balance force can counterbalance a television that weighs about 40 pounds. Other types of force adjustment mechanisms can include, without limitation, one or more motors (e.g., stepper motors), linear slides, threaded rods, pulleys, combinations thereof, or the like.

Figure 10:
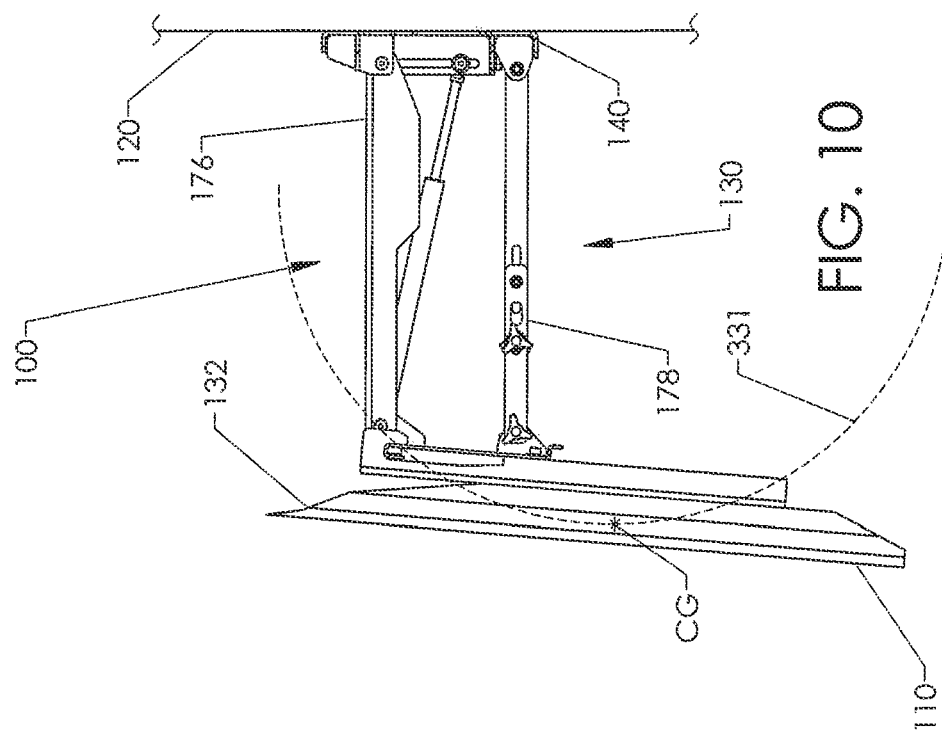
FIG. 10 is a side elevational view of the mounting system in a deployed expanded configuration.
Figure 9:
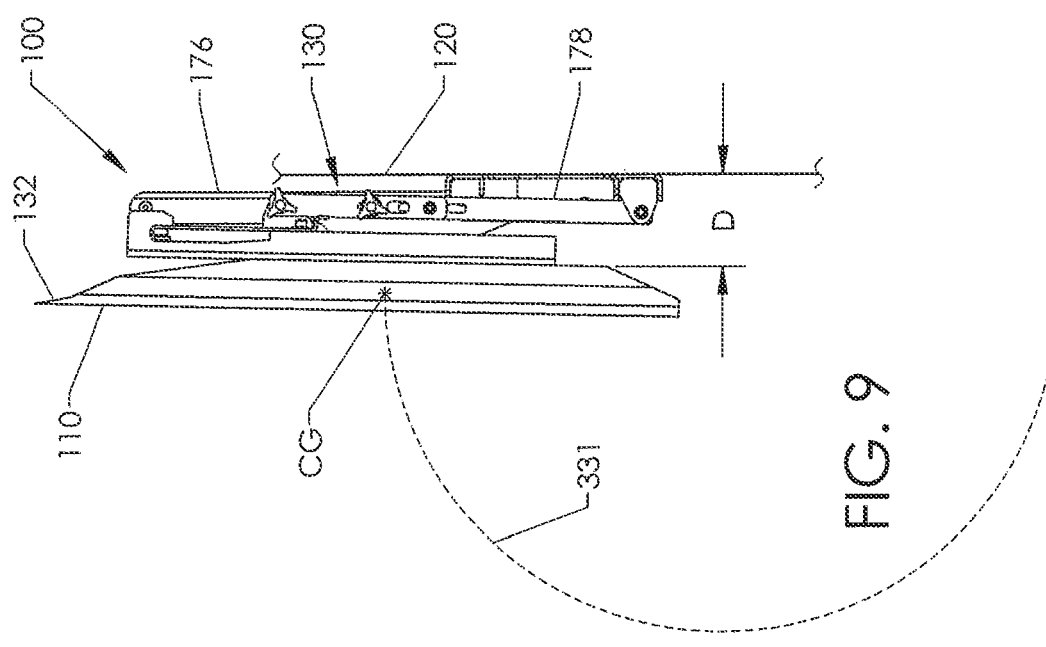
FIG. 9 is a side elevational view of the mounting system in a stowed configuration.
Figure 11:
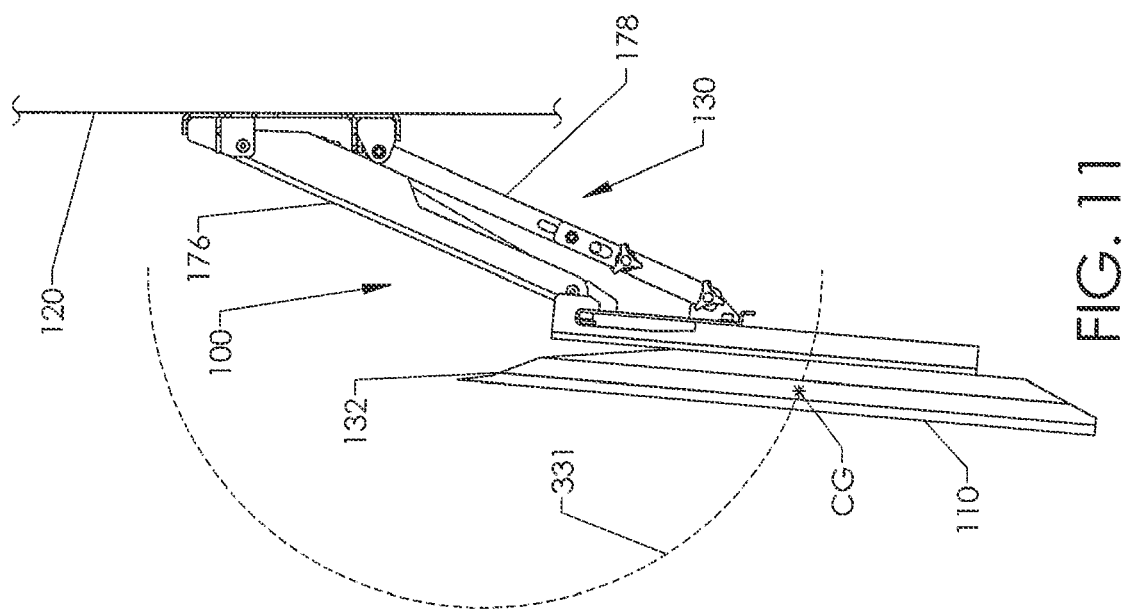
FIG. 11 is a side elevational view of a television in a lowered position.

FIGS. 9, 10, and 11 show the television 110 in a stowed position, an intermediate position, and a lowered position, respectively. The linkage assembly 130 of FIG. 9 is in a substantially upright position. The lower links 178 move away from and remain substantially parallel to the upper link 176 as the television 110 moves away from the wall 120. FIG. 10 shows the linkage assembly 130 in an expanded configuration and extending substantially horizontally away from the support bracket 140. FIG. 11 shows the linkage assembly 130 in a lowered configuration and extending downwardly away from the support bracket 140. Details of the illustrated positions are discussed below.

Referring to FIG. 9, wall mount 100 has a relatively low-profile configuration to minimize a distance D between the television 110 and the support surface 120. In some embodiments, distance D is less than about 8 inches, 6 inches, 5 inches, 4 inches, or 2 inches. Other distances Dare also possible. The upper link 176 and lower links 178 nest together to provide a space saving and aesthetically pleasing low profile configuration.

As the television 110 is moved downwardly along a path 331, it can tilt backwardly (e.g., rotate clockwise as viewed from the side) such that the screen is angled upwardly, as illustrated in FIGS. 10 and 11. The wall mount 100 can also be modified to be a five bar linkage to provide such motion. The television 110 of FIG. 11 is especially well positioned for viewers with their heads positioned slightly above the center of the screen. Alternatively, television 110 can be moved along the path 331 without appreciably changing the tilt setting. For example, the center gravity (CG) of the television 110 can travel along the generally arcuate path 331 without appreciable rotation or angular displacement of the television 110. Thus, television 110 can be translated or rotated, or both.

The upper link 176 and lower links 178 can rotate about respective axes of rotation 182, 180 from about 130 degrees to about 180 degrees. In some embodiments, the upper link 176 and lower links 178 rotate about the respective axes of rotation 182, 180 about 160 degrees. If the television 110 is mounted above a fireplace, upper link 176 and lower links 178 can rotate about respective axes of rotation 182, 180 an angle in a range of about 90 degrees to about 160 degrees. Other angles are also possible, if needed or desired.

FIGS. 12-15 show the linkage assembly 130 in a substantially upright position. The lower links 178 are alongside and laterally adjacent to the upper linkage 176. FIG. 13 shows at least a portion of the lower link 178a positioned in front of the upper link 176 as viewed along the lower axis of rotation 182. As shown in FIGS. 14 and 15, upper link 176 is positioned between the lower links 178a, 178b. Such a nested arrangement provides a relatively low profile to position the mounted object very close to a wall.

Figure 16:
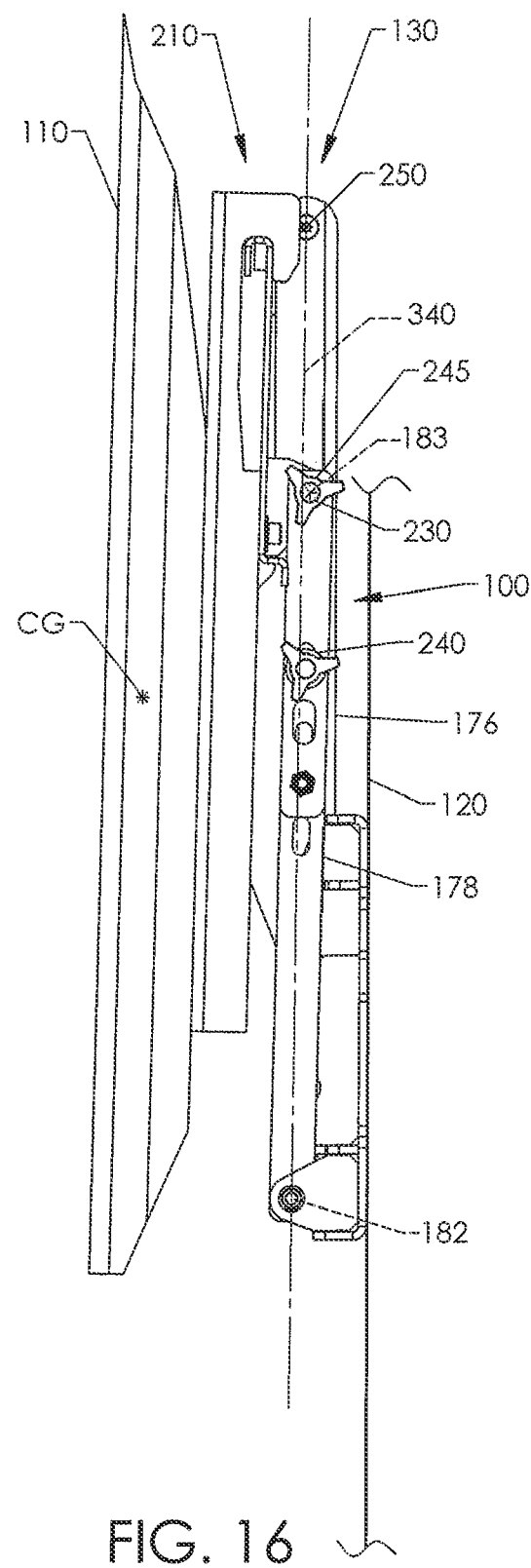
FIG. 16 is a side elevational view of the stowed mounting system holding a television generally parallel relative to a wall.
Figure 17:
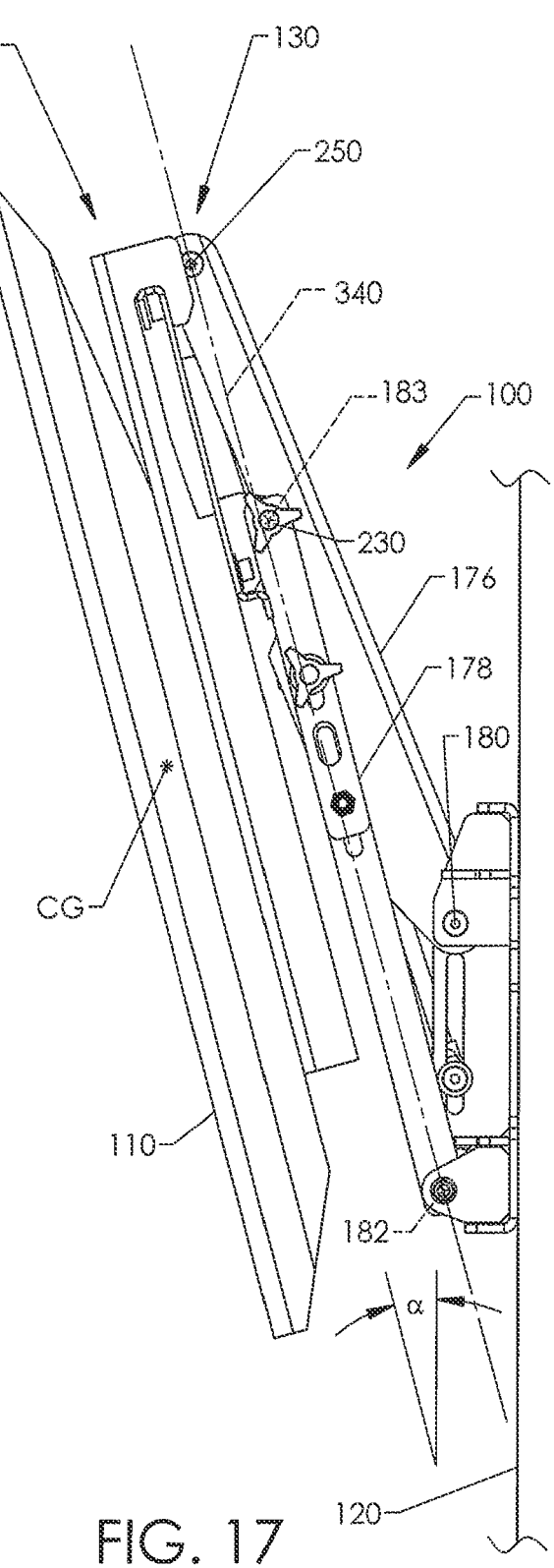
FIG. 17 is a side elevational view of the stowed mounting system holding a television tilted downwardly.

FIGS. 13, 16, and 17 show the linkage assembly 130 in an over-center configuration. The CG of the television 110 and the axis of rotation 183 are on opposite sides of an imaginary plane 340. The lower inner axis of rotation 182 and tilt axis of rotation 250 lie in the imaginary plane 340. Gravitational force acting on the television 110 causes the pivots 230 to be pushed towards the wall 120 to keep the linkage assembly 130 in the stowed configuration. A locking mechanism 245, illustrated as a locking knob mechanism, can be tightened to ensure that the linkage assembly 130 remains locked. The locking mechanism 245 can comprise a handle with a threaded member. The handle can be rotated to press the link 178 against a portion of the bracket 210 to prevent or inhibit relative movement between the link 178 and the bracket 210. In other embodiments, the locking mechanism 245 can be in the form of a fine tune tilt adjustment mechanism and can include one or more gears, ratchet mechanisms, or other features that allow controlled tilting.

When the linkage assembly 130 is in an unlocked state, the bottom of the television 110 can be pulled away from the support bracket 140 to move the pivots 230 away from the wall 120 and across the imaginary plane 340. Once the pivots 230 move across the imaginary plane 340, the linkage assembly 130 is released, thus allowing lowering of the television 110.

The lengths of the links 178 of FIG. 16 may be decreased to rotate the television 110 counterclockwise about the axis of rotation 250 so as to move the bottom of the television 110 rearwardly. The links 178 of FIG. 17 can be lengthened to tilt the top of the television 110 rearwardly. In various embodiments, television 110 can be tilted an angle α (FIG. 17) of about ±5 degrees to about ±55 degrees. In certain embodiments, a tilt angle α of about 15 degrees can be achieved.

Figure 18:
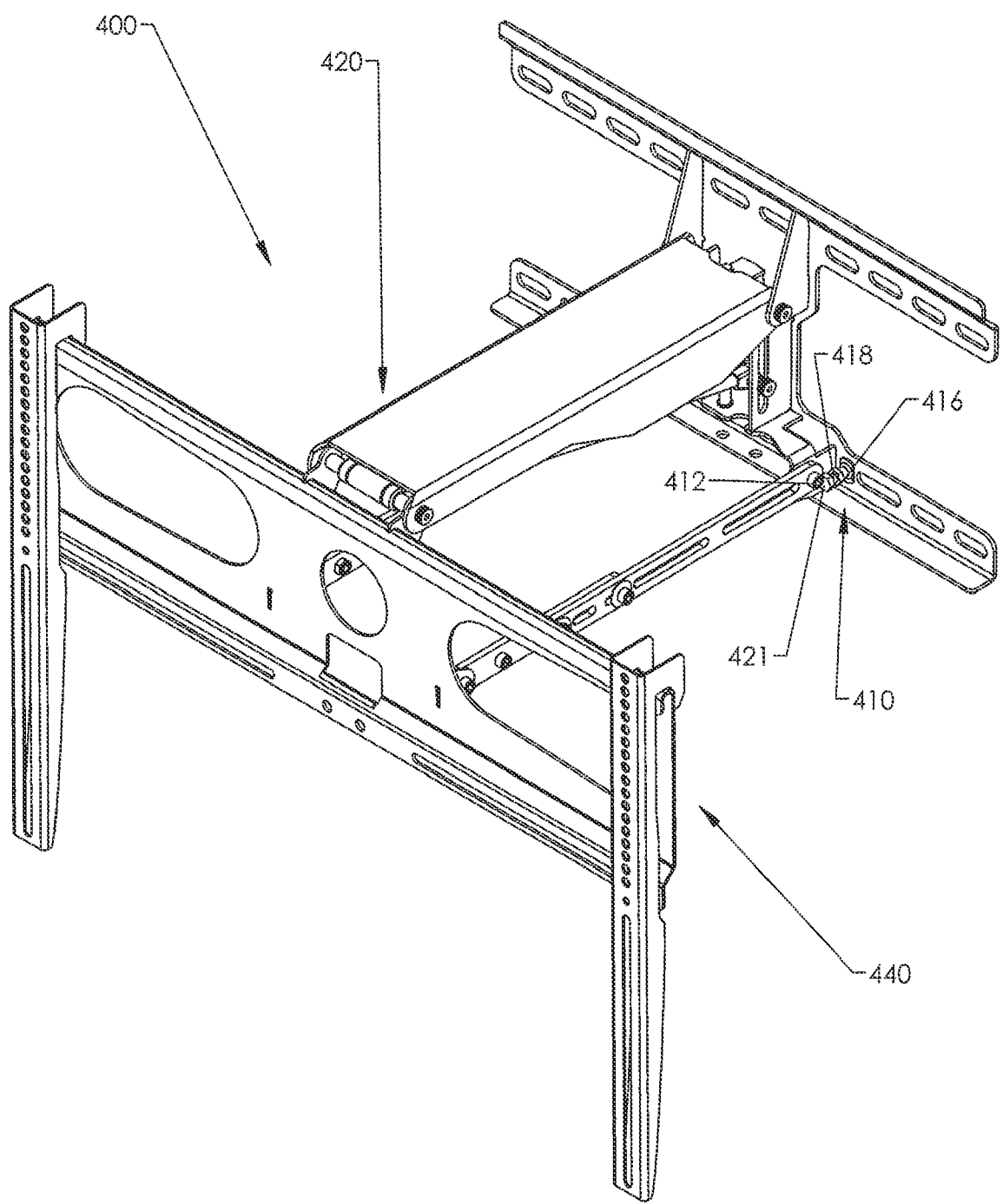
FIG. 18 is an isometric view of a mounting configuration.
Figure 19:
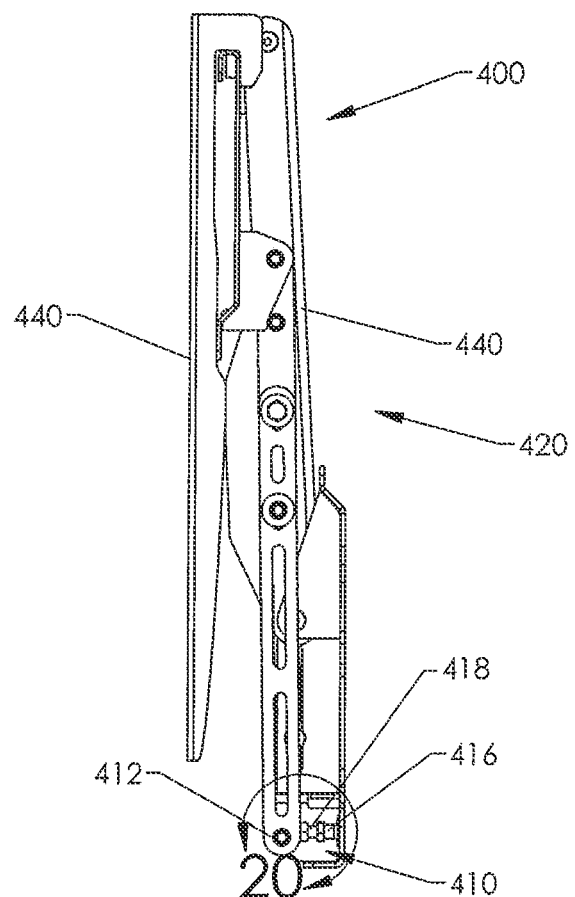
FIG. 19 is a side elevational view of the mounting system of FIG. 18 in a stowed configuration.
Figure 20:
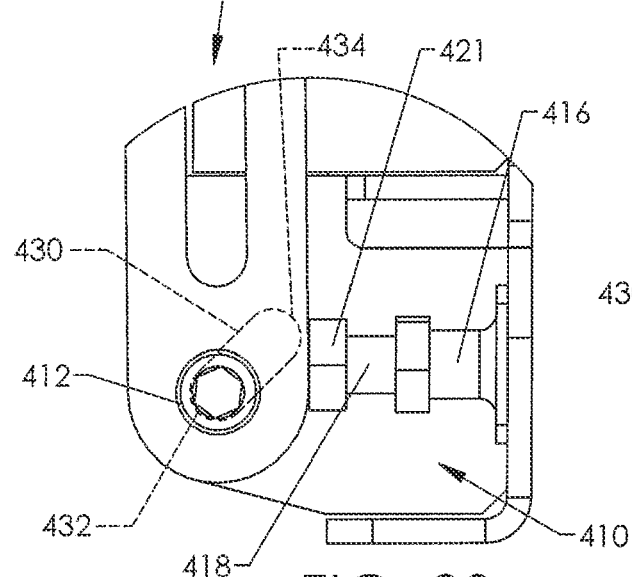
FIG. 20 is a detailed view of a positioner of FIG. 19.

FIGS. 18 and 19 show a mounting system 400 that is generally similar to the mounting system 100 discussed in connection with FIGS. 1-17, except as detailed below. A positioner 410 includes a base 416 and a movable member in the form of an adjustment screw 418. The adjustment screw 418 has external threads that engage internal threads along a passageway in the base 416. A head 421 can limit travel of a pivot 412 along a slot 430, illustrated in phantom line in FIGS. 20 and 20A.

Figure 21:
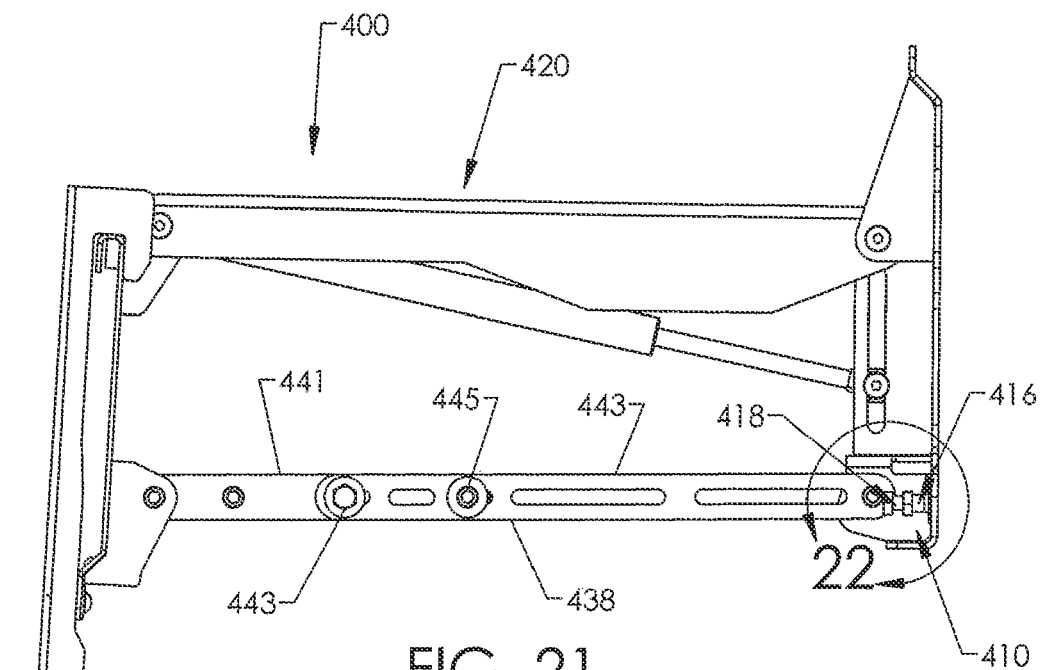
FIG. 21 is a side elevational view of the mounting system of FIG. 18 in a deployed configuration.
Figure 22:
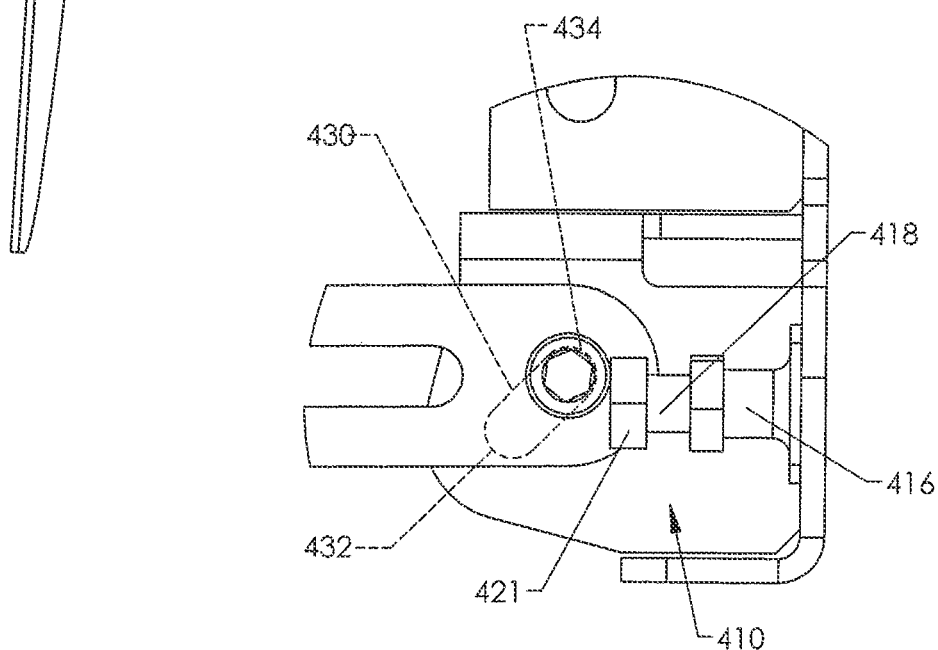
FIG. 22 is a detailed view of the positioner of FIG. 21.
Figure 23:
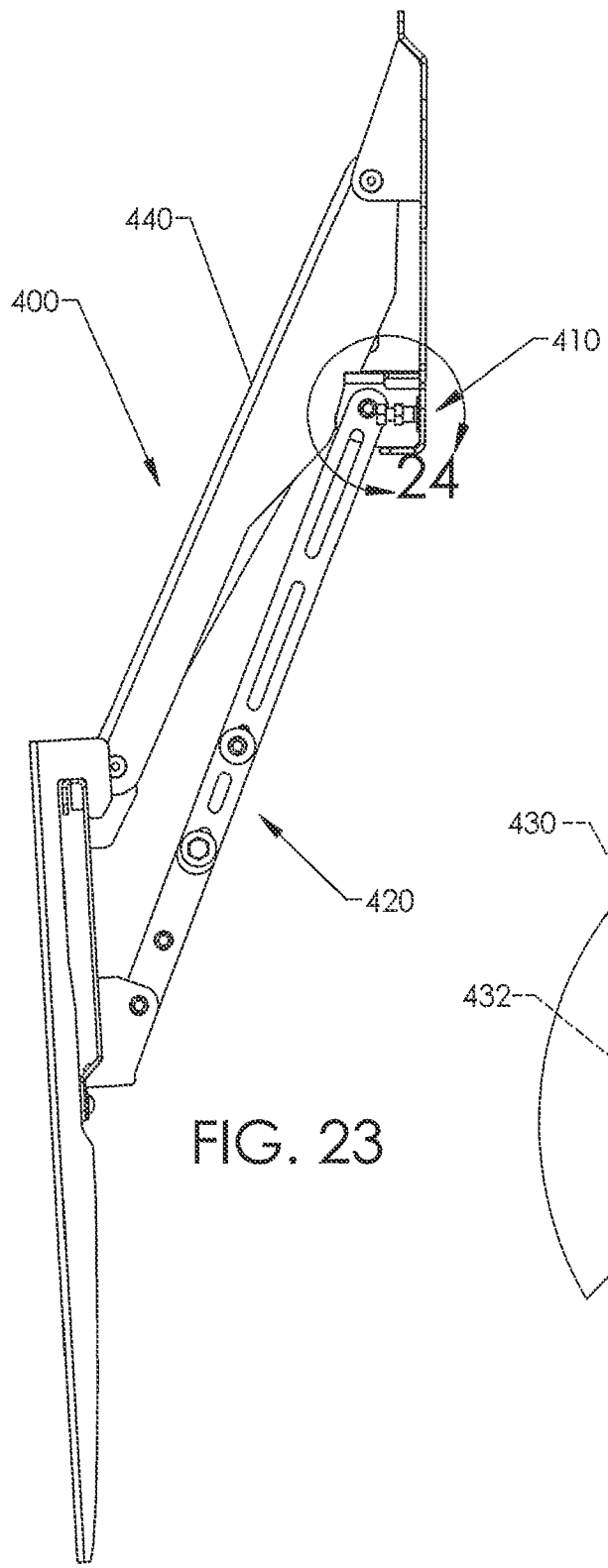
FIG. 23 is a side elevational view of the mounting system of FIG. 18 holding a television at a lowered position.
Figure 24:
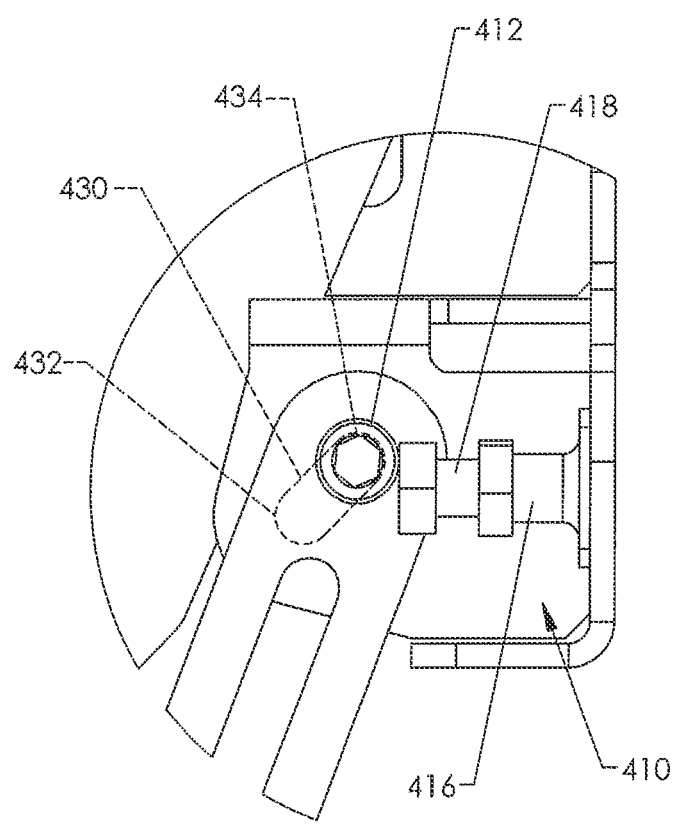
FIG. 24 is a detailed view of the positioner.

Referring again to FIG. 19, linkage assembly 420 is in a stowed configuration. Pivot 412 is forced towards a forward lower end 432 of the slot 430. As a display bracket 440 is moved downwardly, pivot 412 can slide rearwardly and upwardly along the slot 430. FIGS. 21 and 22 show the pivot 412 positioned at a rearward upper end 434 of the slot 430. Referring to FIGS. 23 and 24, pivot 412 is at the rearward upper end 434 of the slot 430. The load applied by a mounted object pushes the pivot 412 towards the rearward upper end 434.

The illustrated head 421 can be moved by rotating the adjustment screw 418. By moving the adjustment screw 418 into and out of the base 416, tilt of the mounted object can be adjusted. For example, adjustment screw 418 can be moved outwardly away from the wall to tilt the display bracket 440 rearwardly. The link 438 has elongate members 441, 443 that can be moved relative to one another to provide large amounts of adjustment. A locking mechanism 443 can be tightened using a wrench or other tool to lock the linkage 438. In the illustrated embodiment, a pin 445 extends through a slot in the elongate member 443 and a hole in the elongate member 441.

Figure 20A:
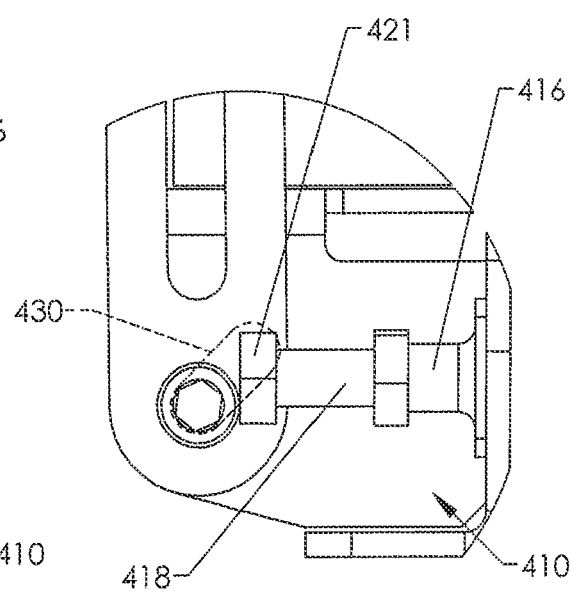
FIG. 20A is a detailed view of the positioner in an extended configuration.

The positioner 410 can function as a mode of operation selector to alternate the mounting system 400 between a four bar linkage system and a five bar linkage system. As shown in FIG. 20A, when the adjustment screw 418 is in an extended position, pivot 412 is translationally fixed. The mounting system 400 thus functions as four bar linkage system. When the adjustment screw 418 is moved into the base 416 to allow translation of the pivot 412 along the slot 430, the mounting system 400 functions as a five bar linkage system.

Figure 25:
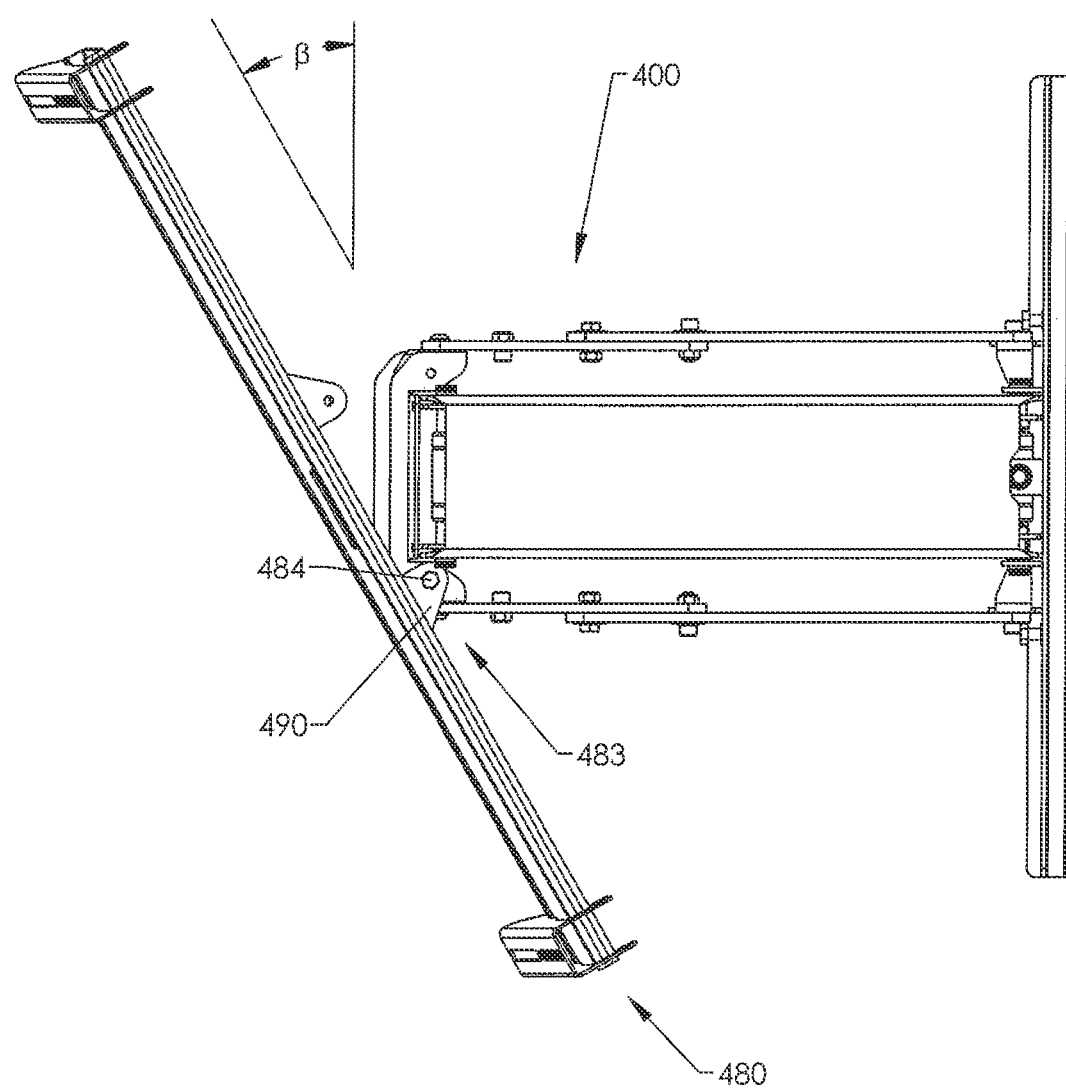
FIG. 25 is a top plan view of the mounting system of FIG. 18.
Figure 26:
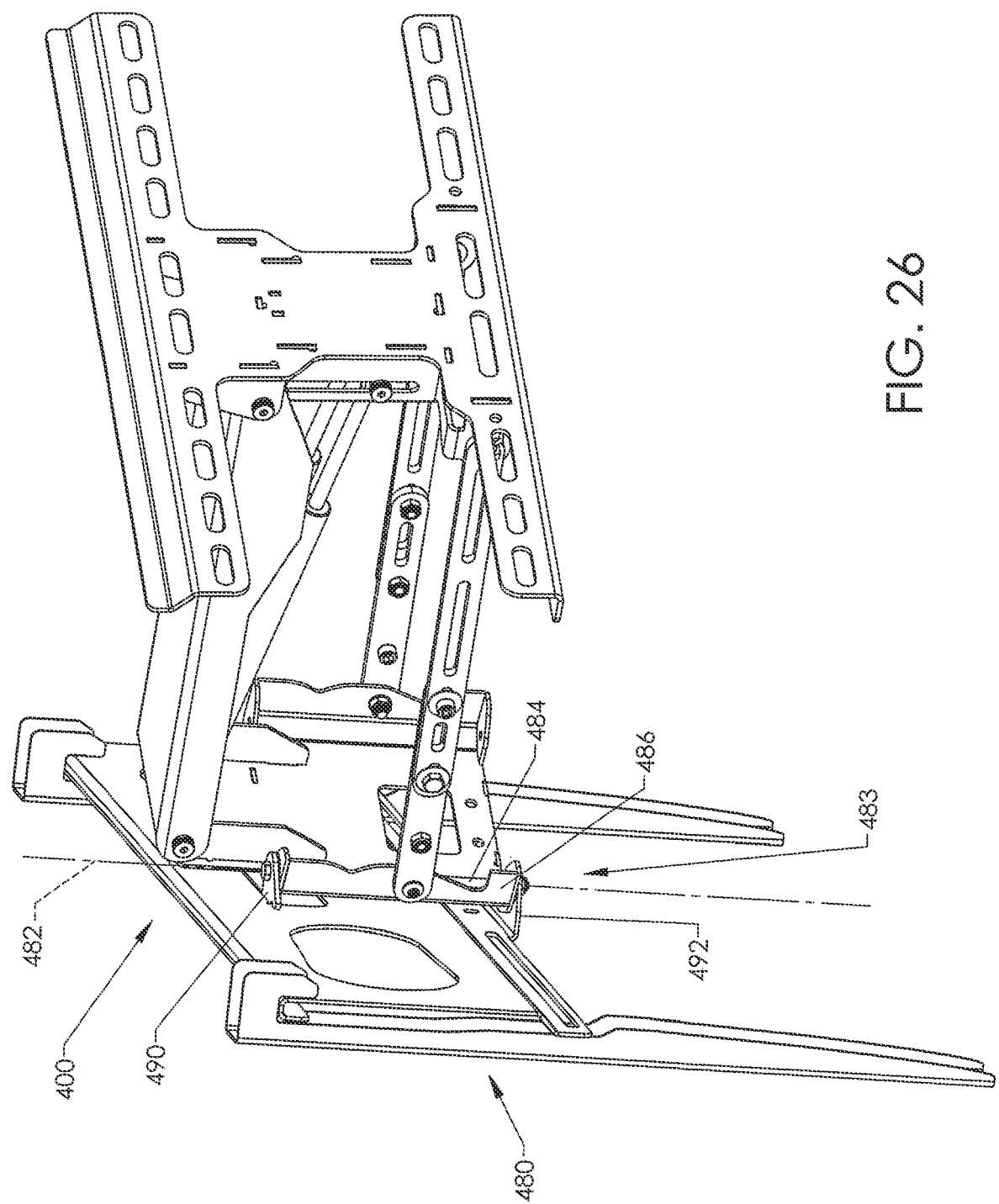
FIG. 26 is a rear, top, and left side isometric view of the mounting system of FIG. 25.

FIGS. 25 and 26 show a display bracket 480 rotatable about an axis of rotation 482, illustrated as a vertical axis of rotation, defined by a swivel mechanism 483. The swivel mechanism 483 includes a pin 484 held by a retainer 486 and mounts 490, 492. The mounts 490, 492 and/or retainer 486 can have slots, holes, or other types of features to allow different types of pivoting or swivel action. The display bracket 480 can be rotated to the left and right an angle β of about ±5 degrees to about ±55 degrees.

Figure 27:
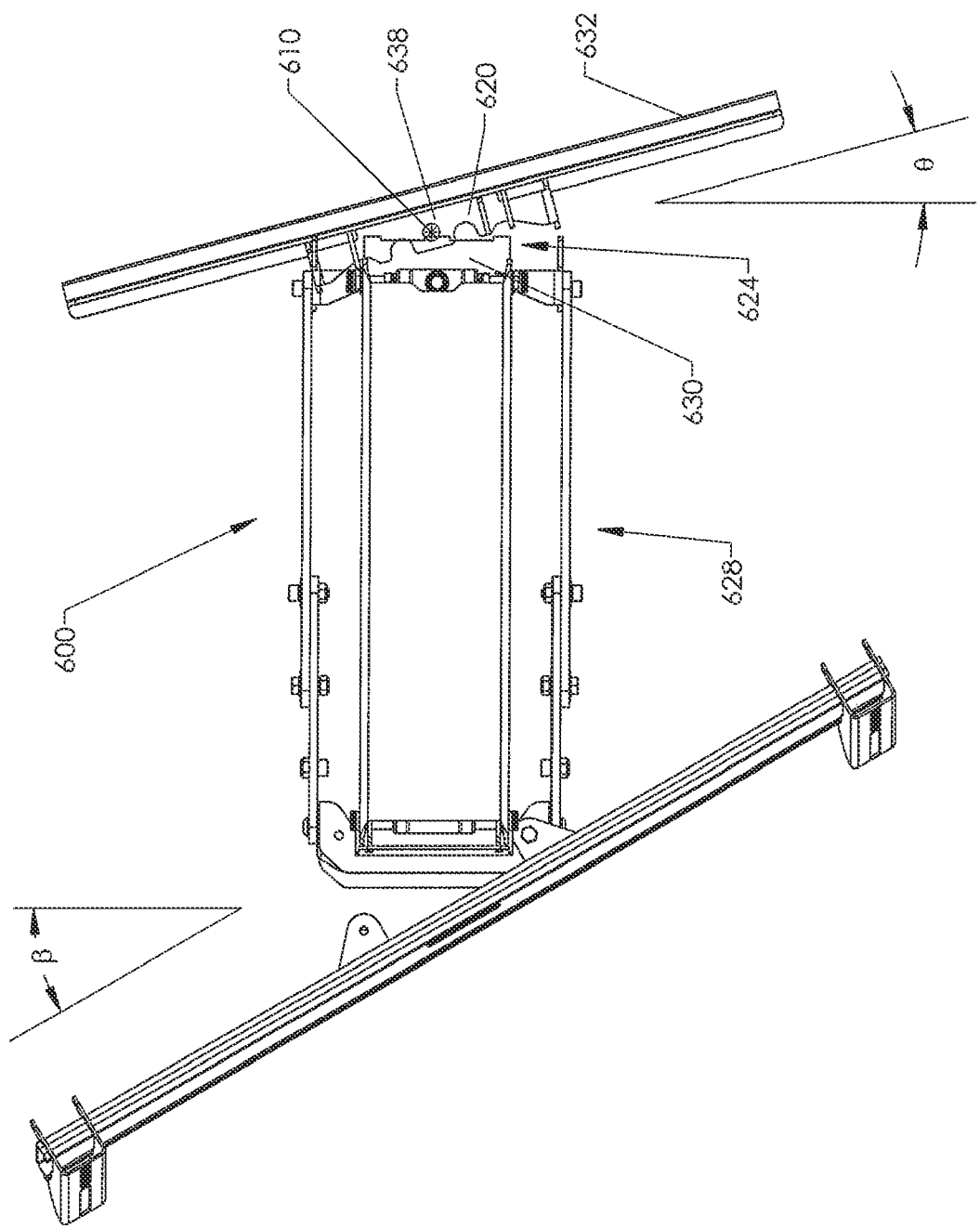
FIG. 27 is a top plan view of a mounting system, in accordance with another embodiment.

Mounting systems can include any number of swivel mechanisms. For example, swivel mechanisms can couple links to the support bracket and can couple the links to the display bracket. The number, positions, and orientations of the swivel mechanisms can be selected to achieve the desired functionality. FIG. 27 shows a wall mount 600 that includes a swivel mechanism 624 that connects a linkage assembly 628 to a support bracket 632. The swivel mechanism 624 includes a pin 638 held by a mount 620. A retainer 630 pivots with respect to the pin 638 to rotate about an axis of rotation 610. The linkage assembly 628 can be rotated to the left and to the right an angle θ of about ±5 degrees to about ±30 degrees. Other angles are also possible, if needed or desired.

Figure 28:
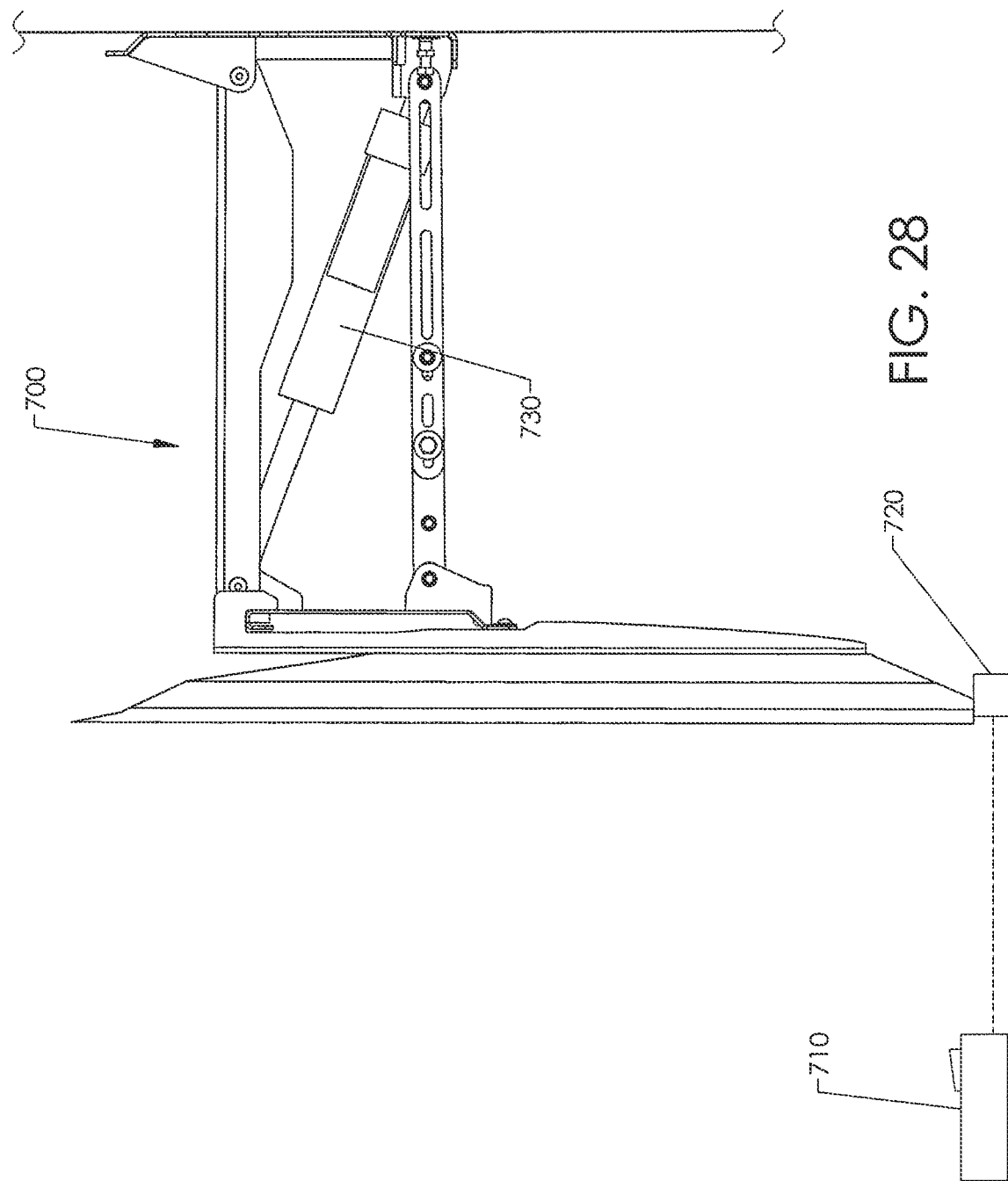
FIG. 28 is a side elevational view of a motorized mounting system, in accordance with one embodiment.

FIG. 28 shows an automated mounting system 700 that can be moved using a controller 510 that communicates with a control device 720. A motorized actuator 730 raises and lowers the television. The control device 720 can include a receiver that is communicatively coupled (e.g., wirelessly coupled, capacitively coupled, inductively coupled, or the like) to a transmitter of the controller 710. A control device 720 can store information in memory and include one or more computing devices or processors. Memory can include, without limitation, volatile memory, non-volatile memory, read-only memory (ROM), random access memory (RAM), and the like. Stored information can include, but is not limited to, settings, weight of mounted object, or the like. Settings can include, but are not limited to, position settings (e.g., stowed positions, lowered positions, intermediate positions, or the like), times (e.g., times to automatically move the object), or the like.

If the mounting system 700 is mounted above a mantel, the control device 720 can be programmed to ensure that the mounting system does not strike the mantel as a television is lowered downwardly past the top of the mantel. At a predetermined time (e.g., after normal bed time), the mounting system 700 can be automatically moved to the stowed configuration such that children cannot easily reach and pull on the television the next morning. In some embodiments, mounting system 700 can be automatically returned to the stowed configuration after the television has been turned OFF for a certain period of time.

The control device 720 can be programmed to move the television 110 to different positions, each having a different indicator (e.g., number, code, etc.). The indicator can be entered using the controller 710. Additionally or alternatively, control device 720 can include input devices, such as a touch pad, a touch screen, a keyboard, or the like. A user can use the input device to move the mounting system 700 into different positions without utilizing any remote. If the control device 720 is hidden behind a television, the user can reach behind the television to access the control device 720 and position the television as desired.

Various methods and techniques described above provide a number of ways to carry out the invention. Of course, it is to be understood that not necessarily all objectives or advantages described may be achieved in accordance with any particular embodiment described herein and may depend on the use of the mounting systems. Thus, for example, those skilled in the art will recognize that the methods may be performed in a manner that achieves or optimizes one advantage or group of advantages as taught herein without necessarily achieving other objectives or advantages as may be taught or suggested herein. Furthermore, the skilled artisan will recognize the interchangeability of various features from different embodiments disclosed herein. Similarly, the various features and acts discussed above, as well as other known equivalents for each such feature or act, can be mixed and matched by one of ordinary skill in this art to perform methods in accordance with principles described herein.

Although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, it is not intended that the invention be limited, except as by the appended claims.

What is claimed is:

1. A mounting system comprising:
a fixed support bracket configured to be coupled to a vertical wall;
an articulating assembly configured to carry a television and including
a television bracket, and
a linkage assembly rotatable about an upper axis of rotation relative to the television bracket and rotatable about a lower axis of rotation relative to the fixed support bracket, the linkage assembly reconfigurable to move the television bracket from a raised position to a lowered position to move the television bracket away from the vertical wall and to adjust tilt of the television bracket; and
a counterbalance mechanism coupled to the fixed support bracket and configured to counterbalance the television, the counterbalance mechanism including
a biasing mechanism rotatable about a biasing axis of rotation relative to the fixed support bracket, the biasing axis of rotation and the television are located on opposite sides of an imaginary plane passing through the upper axis of rotation and the lower axis of rotation when the television bracket is in the raised position,
a threaded rod, and
a carriage coupled to the biasing mechanism and the threaded rod, wherein rotation of the threaded rod relative to the carriage causes the carriage to move along the threaded rod to adjust a length of the biasing mechanism, thereby adjusting counterbalancing provided by the counterbalance mechanism.

2. The mounting system of claim 1, wherein the biasing axis of rotation is translationally fixed relative to the fixed support bracket when the television bracket is moved between the raised position and the lowered position and the threaded rod is rotationally stationary relative to the carriage.

3. The mounting system of claim 1, wherein the counterbalance mechanism includes a body substantially surrounding the carriage, wherein the threaded rod is translationally fixed with respect to the body of the counterbalance mechanism.

4. The mounting system of claim 1, wherein the threaded rod has a head facing away from the carriage such that the head is accessible to a user to allow for adjustment of the counterbalancing provided by the counterbalance mechanism.

5. The mounting system of claim 1, wherein the threaded rod is rotatable to configure the counterbalance mechanism to set a counterbalancing force that allows at least a portion of the television bracket to be lowered below a top of the fixed support bracket.

6. The mounting system of claim 1, further comprising a tilt adjustment mechanism configured to set tilt of the television bracket relative to the linkage assembly.

7. The mounting system of claim 1, wherein the counterbalance mechanism is operable to adjust an amount of extension, contraction, or both extension and contraction of the biasing mechanism.

8. The mounting system of claim 1, wherein the threaded rod is rotatable to extend and contract the biasing mechanism as the carriage moves along the threaded rod.

9. The mounting system of claim 1, wherein the threaded rod is rotatable to adjust the counterbalancing while the television bracket is stationary, wherein the biasing mechanism includes two extendable biasing devices.

10. The mounting system of claim 1, wherein the counterbalance mechanism extends or contracts while the television bracket is moved between the raised position and the lowered position.

11. A mounting system comprising:
a fixed support bracket configured to be coupled to a vertical wall;
an articulating assembly including
a television bracket configured to couple to a television, and
a linkage assembly rotatably coupled to the television bracket and rotatably coupled to the fixed support bracket, the linkage assembly reconfigurable to
move the television bracket from a raised position to a lowered position to move the television bracket away from the vertical wall, and
cause rotation of a lower portion of the television bracket relative to the linkage assembly in a direction toward the vertical wall to tilt the television bracket to face downwardly when the television bracket is moved toward the raised position; and
a counterbalance mechanism configured to provide counterbalancing of the television, the counterbalance mechanism including
a threaded member; and
a carriage coupled to the threaded member, wherein rotation of the threaded member relative to the carriage causes the carriage to move along the threaded member to adjust counterbalancing provided by the counterbalance mechanism.

12. The mounting system of claim 11, wherein the counterbalance mechanism is pivotally coupled to the articulating assembly.

13. The mounting system of claim 11, wherein the counterbalance mechanism further comprises a biasing mechanism rotatably coupled to the fixed support bracket.

14. The mounting system of claim 11, wherein the counterbalance mechanism further comprises a biasing mechanism having an end rotatable about an axis of rotation that is translationally fixed relative to the fixed support bracket when the television bracket is moved between the raised and lowered positions and the threaded member is rotationally stationary.

15. The mounting system of claim 11, wherein the carriage is movable along the threaded member between a first position and a second position, wherein the counterbalance mechanism provides a first counterbalancing force when the carriage is in the first position, wherein the counterbalance mechanism provides a second counterbalancing force when the carriage is in the second position, and wherein the first counterbalancing force is different from the second counterbalancing force.

16. The mounting system of claim 11, wherein the counterbalance mechanism extends or contracts while the television bracket is moved between the raised position and the lowered position.

17. The mounting system of claim 11, wherein the counterbalance mechanism further comprises a biasing mechanism that extends and/or contracts as the carriage moves along the threaded member.

18. A method comprising:
coupling a support bracket of a mounting system to a vertical wall;
coupling a television to a display bracket of the mounting system;
adjusting a counterbalancing mechanism of the mounting system by rotating a threaded member to move at least one biasing mechanism relative a linkage assembly of the mounting system, wherein the threaded member is rotatable to position the at least one biasing mechanism at a first position to provide a first counterbalancing force, and the threaded member is capable of being rotated to position the at least one biasing mechanism at a second position to provide a second counterbalancing force;
preventing contact between the linkage assembly and an object below the support bracket, wherein the linkage assembly is movable between a raised configuration and a lowered configuration, wherein the linkage assembly includes
an upper arm rotatably coupled to the support bracket, and
a lower arm rotatably coupled to the support bracket.

19. The method of claim 18, further comprising operating a motorized device to move the television vertically.

20. The method of claim 18, wherein the display bracket swivels relative to the linkage assembly.

21. The method of claim 18, wherein the at least one biasing mechanism includes two extendable biasing devices.

22. A mounting system comprising:
a fixed support bracket;
an articulating assembly including
a television bracket, and
a linkage assembly rotatably coupled to the television bracket, the linkage assembly operable to move the television bracket between a raised position and a lowered position,
wherein when the television bracket is moved from the raised position to the lowered position, the articulating assembly is configured to cause
rotation of the television bracket relative to the linkage assembly about an axis of rotation to move a bottom of the television bracket in a direction away from the fixed support bracket, and
rotation of a swivel axis about the axis of rotation, wherein the articulating assembly allows swiveling of the television bracket about the swivel axis to move the television bracket relative to the linkage assembly; and
a counterbalance mechanism including
a slider, and
a threaded member along which the slider moves when the threaded member is rotated relative to the slider so as to adjust counterbalancing provided by the counterbalance mechanism.

23. The mounting system of claim 22, wherein the counterbalance mechanism includes additional components that slide relative to one another to adjust a length of a biasing element of the counterbalance mechanism.

24. The mounting system of claim 22, wherein the counterbalance mechanism includes at least one biasing mechanism that shortens in length when the television bracket is moved from the raised position to the lowered position.

25. The mounting system of claim 22, wherein the threaded member is substantially surrounded by a body of the counterbalance mechanism.

26. The mounting system of claim 22, wherein the counterbalance mechanism further comprises a biasing mechanism rotatable relative to the fixed support bracket.

27. The mounting system of claim 22, wherein the counterbalance mechanism further comprises a biasing mechanism having an end rotatable about an axis of rotation that is translationally fixed relative to the fixed support bracket when the slider is held stationary along the threaded member.

28. The mounting system of claim 22, wherein the slider moves linearly along the threaded member when the threaded member is rotated about its longitudinal axis so as to set a counterbalancing force provided by the counterbalance mechanism.

29. The mounting system of claim 22, wherein the counterbalance mechanism extends or contracts when the television bracket is moved between the raised position and the lowered position.

30. The mounting system of claim 22, wherein the articulating assembly operates as a four bar linkage or a five bar linkage.

31. A mounting system comprising:
a fixed support bracket configured to be coupled to a vertical wall;
an articulating assembly rotatably coupled to the fixed support bracket and configured to carry a television and including
a television bracket,
a linkage assembly operable to move the television bracket from a raised position to a lowered position, wherein when the linkage assembly is being raised, the linkage assembly is configured to cause rotation of the television bracket relative to the linkage assembly to tilt a screen of the television downwardly; and
a counterbalance mechanism configured to counterbalance a television coupled to the television bracket, wherein the counterbalance mechanism includes at least one biasing mechanism,
a threaded rod, and
a carriage coupled to the at least one biasing mechanism and the threaded rod, wherein rotation of the threaded rod relative to the carriage causes adjustment of the at least one biasing mechanism to adjust counterbalancing provided by the counterbalance mechanism.

32. The mounting system of claim 31, wherein the at least one biasing mechanism has components that slide relative to one another.

33. The mounting system of claim 31, wherein a length of the at least one biasing mechanism increases when the television bracket is moved from raised position to the lowered position.

34. The mounting system of claim 31, further comprising a rigid protective body substantially surrounding the carriage and threaded rod while allowing the carriage to move along the threaded rod.

35. A mounting system comprising:
a support bracket coupled to a vertical wall and positioned above an object;
a display bracket coupled to a television;
a linkage assembly coupled the support bracket and the display bracket, wherein the mounting system is configured to prevent contact between the linkage assembly and the object below the support bracket when the linkage assembly is moved from a raised configuration to a fully lowered configuration, wherein the linkage assembly includes
an upper arm rotatably coupled to the support bracket, and
a lower arm rotatably coupled to the support bracket
an adjustable counterbalancing mechanism including at least one biasing mechanism and a threaded member is capable of being rotated to move the at least one biasing mechanism to a first configuration to provide a first counterbalancing force, and the threaded member is capable of being rotated to move the at least one biasing mechanism to a second configuration to provide a second counterbalancing force.

36. The mounting system of claim 35, wherein the display bracket swivels relative to the linkage assembly.

37. The mounting system of claim 35, wherein the at least one biasing mechanism biasing includes two extendable biasing devices.

38. The mounting system of claim 35, wherein the object is a mantel.

39. A mounting system comprising:
a fixed support bracket configured to be coupled to a vertical wall;
an articulating assembly including
a television bracket to carry a television, and
a linkage assembly rotatable about an upper axis of rotation relative to the television bracket and rotatable about a lower axis of rotation relative to the fixed support bracket, the linkage assembly reconfigurable to move the television bracket from a raised position to a lowered position to move the television bracket away from the fixed support bracket; and
a spring device coupled to the fixed support bracket and configured to counterbalance the television, the spring device including
a biasing mechanism rotatable about a biasing axis of rotation relative to the fixed support bracket, wherein the biasing axis of rotation and the television are located on opposite sides of an imaginary plane passing through the upper axis of rotation and the lower axis of rotation when the television bracket is at the raised position,
a threaded rod, and
a carriage coupled to the biasing mechanism and the threaded rod, wherein rotation of the threaded rod relative to the carriage causes the carriage to move along the threaded rod to adjust a length of the biasing mechanism to adjust counterbalancing provided by the spring device.

40. The mounting system of claim 39, wherein the biasing mechanism is configured to extend when the fixed support bracket is lowered and is configured to contract when the fixed support bracket is raised.

\* \* \* \* \*

UNITED STATES PATENT AND TRADEMARK OFFICE
CERTIFICATE OF CORRECTION

| | | |
|---|---|---|
| PATENT NO. | : 11,607,042 B1 | Page 1 of 1 |
| APPLICATION NO. | : 17/587792 | |
| DATED | : March 21, 2023 | |
| INVENTOR(S) | : Kurt William Massey | |

It is certified that error appears in the above-identified patent and that said Letters Patent is hereby corrected as shown below:

In the Specification

In Column 1, Line 21, delete "theft" and insert -- their --.

Signed and Sealed this
Twenty-fourth Day of September, 2024

Katherine Kelly Vidal
*Director of the United States Patent and Trademark Office*